June 28, 1938.  C. BUTTY  2,121,901
TUBULAR BODY FORMING APPARATUS
Filed April 4, 1936  6 Sheets-Sheet 1

INVENTOR
C. Butty
BY
Glascock Downing & Seebold
ATTORNEYS

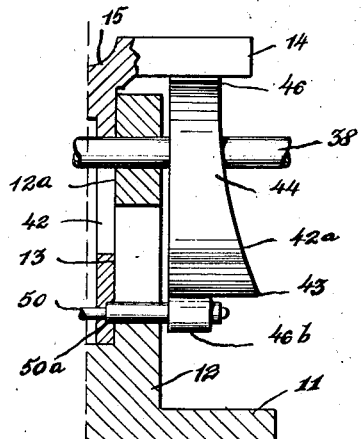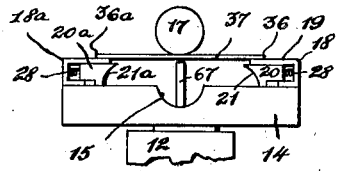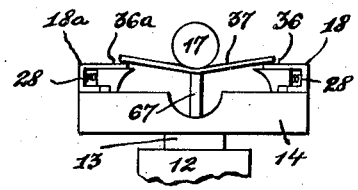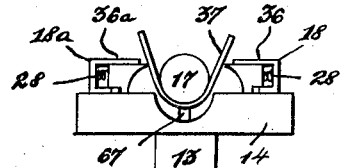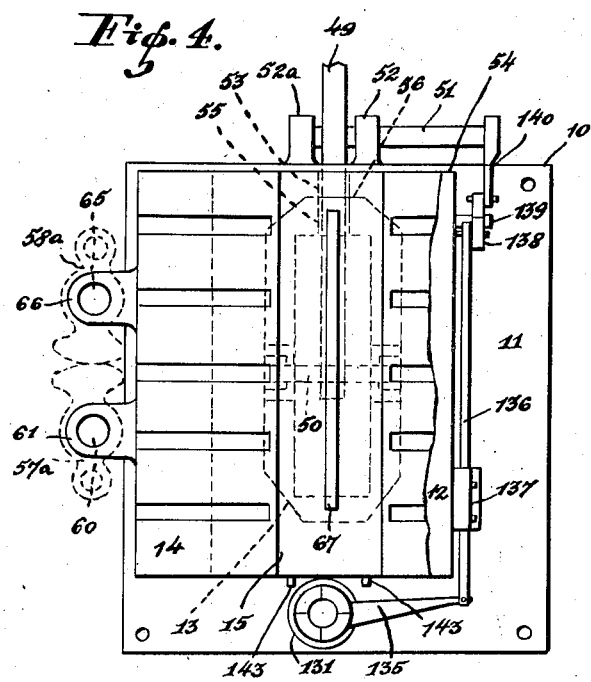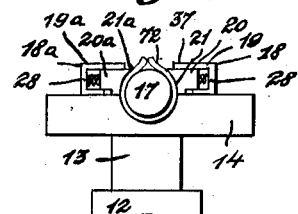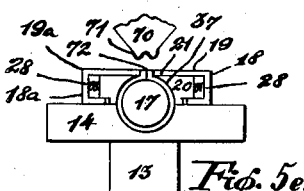

June 28, 1938.                C. BUTTY                    2,121,901
                    TUBULAR BODY FORMING APPARATUS
                       Filed April 4, 1936          6 Sheets-Sheet 3

INVENTOR:
C. Butty
BY:
Glascock Downing & Seebold
ATTORNEYS

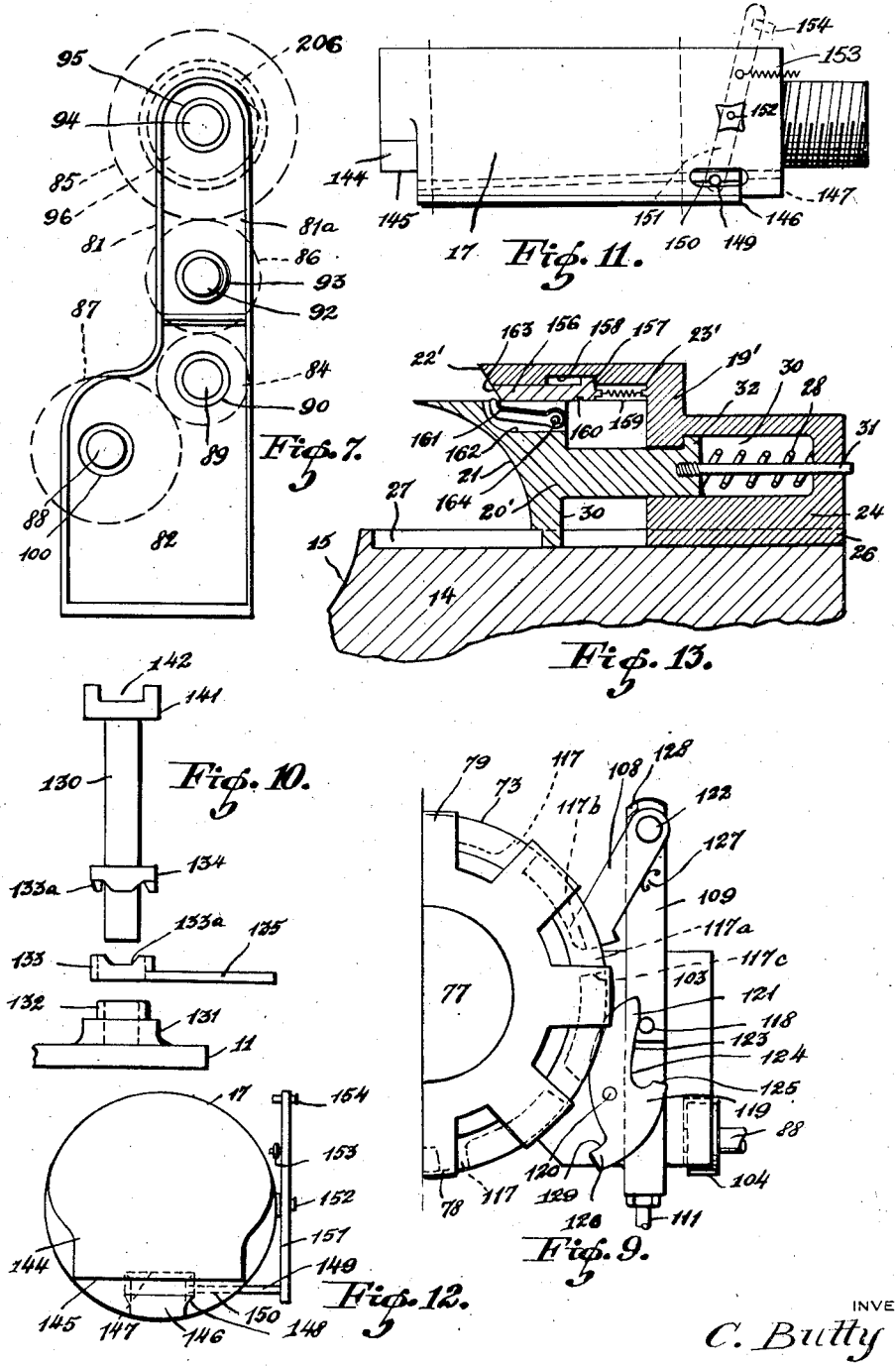

INVENTOR:
C. Butty
BY:
Glascock Downing & Seebold
ATTORNEYS

June 28, 1938.  C. BUTTY  2,121,901
TUBULAR BODY FORMING APPARATUS
Filed April 4, 1936  6 Sheets-Sheet 6

INVENTOR:
C. Butty
BY Glascock Downing & Seebold
ATTORNEYS

Patented June 28, 1938

2,121,901

UNITED STATES PATENT OFFICE 2,121,901

TUBULAR BODY FORMING APPARATUS

Carlos Butty, Buenos Aires, Argentina

Application April 4, 1936, Serial No. 72,822
In Argentina January 3, 1936

21 Claims. (Cl. 153—49)

The present invention relates to the manufacture of tubular bodies having any desired cross section and formed by bending sheet material in a single direction and in particular to a novel machine for producing such bodies in a partially or wholly automatic manner.

The principal object of this invention is to provide a comparatively simple and cheap apparatus of robust construction, whereby the operation of forming the tubular body by bending sheet material around a core or former of any convenient cross-section, may readily be performed with rapidity and precision and the bent sheet material may be held in its formed condition while the longitudinal clamping members are applied thereto.

Another object of the invention is to provide a machine constructed on the basis of the above mentioned apparatus, for the automatic mass-production of the aforesaid bodies.

Another object of the invention is to provide a device for applying and securing the longitudinal clamping members, said device being designed as an accessory to the said apparatus or to the machine of which the apparatus forms the principal part.

Other objects of the present invention will appear in the course of the detailed specification of the same.

My novel tubular-body forming apparatus includes essentially a female die-table between which and a core a relative reciprocation is caused to occur; said die-table is provided with a pair of slides which are caused to recede from and approach each other in a direction perpendicular to the plane in which the relative reciprocation between the table and the core takes place and preferably in a predetermined timed relation with regard to the relative displacement of the table.

The operative surfaces of the table and of the slides together form, when the table and the slides have arrived at the ends of their working strokes, a female die or hollow contour geometrically similar to the contour of the core, which at that moment is concentrically located in the female die formed by the three above mentioned parts, and spaced therefrom by the thickness of the sheet material which is being used to form the tubular body.

The term "tubular body" means, in this specification, a hollow body with open ends defined by a wall of sheet material of one or more layers the cross-section of which is a closed contour of any configuration.

In the majority of cases this contour will be geometric, as for example, polygonal, circular or elliptical, and for this reason it will be sufficient in this specification, to describe the present invention on the basis of such geometric configurations, it being understood, however, that the invention is not limited to these forms. The tubular bodies made by means of the machine which is the object of the present invention, may be used as such or they may be fitted with a base and/or a cover so as to serve as containers.

The forming apparatus as above briefly described may be used by itself (in which event the clamping member may be applied and secured by hand to the longitudinal edges of the body) or in combination with adequate devices or apparatus, as the basis of a partially or wholly automatic body-forming machine. For example, the forming apparatus may be used in conjunction with a fly-press or the like, with or without automatic or semi-automatic means for placing or presenting the cores in their proper position with respect to the table of the apparatus. The said means may take the form of an endless belt or chain or of a reciprocating platform provided with projecting cores, or it may be of the rotary capstan type.

During the body-forming cycle, either the table of the forming apparatus or the core may represent the fixed point, i. e., the core may move toward the table or alternately, the table may move toward the core.

Nevertheless, I provide, preferably and according to one aspect of the present invention, a complete forming machine designed on the basis of the above mentioned forming apparatus.

This machine comprises, in combination, one or more of the aforesaid forming apparatus, a core feeding device, means for applying and/or securing the clamping members, common driving means for these parts, and suitable coordination means actuated from or by common driving means so as to ensure coordinated operation of all the parts.

In the drawings:

Fig. 3 is a part-sectional end elevation of one-half of a slightly modified apparatus;

Fig. 4 is a plan view of the apparatus of Fig. 1 with certain parts cut away;

Figs. 5a to 5e are diagrams illustrating the operation of the forming apparatus;

Fig. 7 is an end view of a part of the machine;

Fig. 9 is a plan view illustrative of a preferred construction of the actuating means for the capstan head;

Fig. 10 is a front view on an enlarged scale of a core support which in certain cases forms a part of the forming apparatus;

Figs. 11 and 12 are respectively a side and a front elevation of a preferred form of core provided with a device for slackening the formed body;

Fig. 13 is a longitudinal section and Fig. 14 a plan view, with certain parts removed, of a modified slide;

Figure 1:
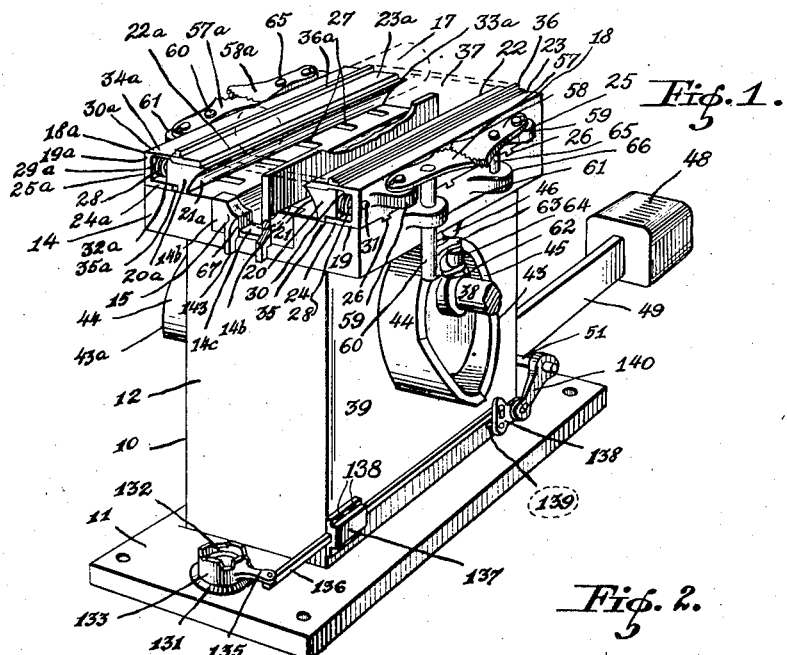
Fig. 1 is a perspective view of a preferred embodiment of an apparatus in accordance with the invention.
Figure 2:
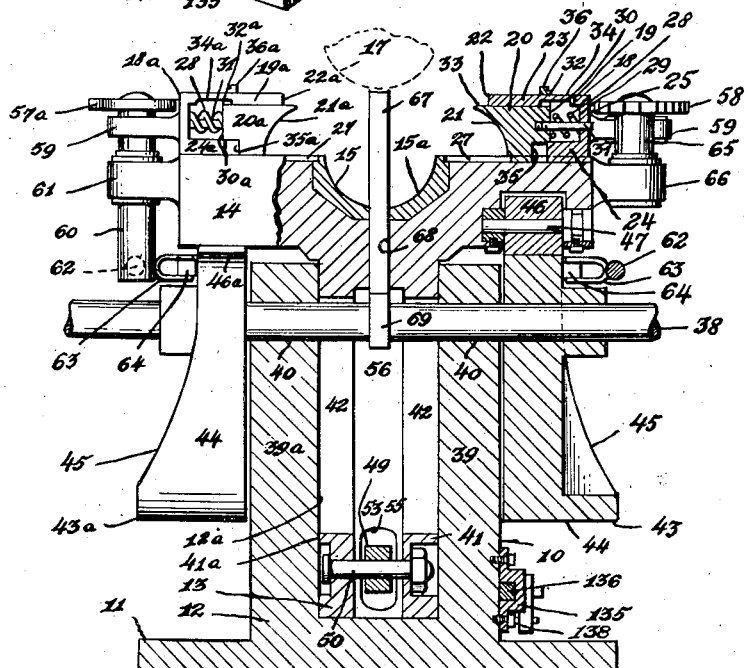
Fig. 2 is a part-sectional end elevation of the apparatus of Fig. 1.

According to Figs. 1, 2 and 4, the forming apparatus which is indicated generally by the reference number 10, comprises a fixed base 11, from which a hollow guide pillar 12 projects. The leg 13 of a die-plate 14 is mounted to slide in a guideway 12a of the guide pillar 12 and vertically with respect to said pillar. The plate 14 and the leg 13 form a whole which is hereinafter called the female die-table or briefly the table, and as seen in Fig. 2, it has a substantially T-shape vertical section. The plate has a cavity 15 centrally located in the surface remote from that which carries the leg 13. Considering a cross-section of the cavity 15, the effective surface of the same— which may be an integral portion of the surface of the plate 14 (Fig. 1) or the exposed surface of a lining 15a (Fig. 2)—has a configuration which corresponds to a portion of the contour of the tubular body to be formed, generally approximately a half of the said contour. In the drawings the apparatus, parts and machine have been illustrated, as designed for the manufacture of cylindrical bodies, so that the cross-section of the effective surface of the cavity 15 is a semi-circle. The cavity 15 extends through the entire length of the plate 14, and is intended to receive a core 17 of a somewhat greater length and having a radius equal to that of the cavity less the thickness of the sheet material of which the body is to be formed.

A pair of complementary slides 18, 18a is mounted one on each side of the cavity 15, and these slides are arranged mutually to approach and recede from one another in a transverse direction with respect to the said cavity. Each of the slides, as for example the member 18, comprises essentially a hollow frame 19 within which a shoe 20 is slidably mounted, said shoe having an operative face 21 which is directed towards the cavity 15 and has a cross-sectional configuration geometrically similar to a portion of that part of the contour of the core which does not correspond to the cavity 15. Generally said portion is substantially one-half of the said part of the core contour. In this way the cavity together with the two shoes 20, 20a, when these latter are in their operative position, form a die or matrix the cross-section of which corresponds to the outer contour of the body to be formed, that is to say, to the contour of the core 17 when covered with the sheet material. The circumferential extension of the real inner surfaces of the female die composed in the form described is not exactly equal to the outer perimeter of the body, for the reason that, in order to apply the clamping member it is necessary that there be a sufficient space to permit the placing of the said clamping member while the sheet material is still firmly held by the members 18, 18a. For the purposes of the present description the apparatus has been illustrated as intended for the formation of tubular bodies in which the clamping member has such a form that the longitudinal edge portions on each side of the joint must be positioned with their inner faces in contact and must be directed outwardly in a radial, tangential or intermediate direction in order to receive the said clamping member. With this condition in mind the peripheral extension of the said inner surfaces of the compound female die will be in the case illustrated equal to the external perimeter of the body to be formed, less twice the thickness of the sheet material.

As soon as the sheet material is wrapped around the core 17, and until the clamping member be applied to it, the said edge portions of the formed but still unclamped body, are pressed together and held in a proper position for receiving the clamping member, by the inner edges 22, 22a of the upper walls 23, 23a of the frames 19, 19a, said upper walls being those remote from the plate 14.

Besides the upper wall 23, the frame 19 comprises a base 24 facing the wall 23 and in contact with the plate 14, and a side wall 25 which connects the wall 23 with the base 24, so that the frame has a cross-section in the shape of a U lying down with the arm which is farthest from the plate 14 longer than the other or base 24, and with its mouth directed toward the cavity 15. The base 24 is provided with means for slidably coupling it to the plate 14, for example, the dovetails 26, which in the embodiment illustrated run in the grooves 27 cut in the surface of the plate 14. Frame 19a is similarly constructed.

As already indicated, and for the purpose hereinafter explained, the shoes 20, 20a are slidably mounted within the frames 19, 19a. They are normally held in a position in which the upper part of the shoe projects slightly from the edge 22 or 22a of the respective frame, by suitable means, as for example the springs 28, interposed between the inner face 29 of the side wall 25 and the side face 30 of the shoe, that is to say, the face remote from the operative surface 21. For the purpose of holding the springs in their places, guide rods 31 may be provided, the ends of which remote from the shoes are free to slide in openings made in the side wall 25 of the frame 19, while their other ends may be screwed into the shoes (see Fig. 2).

The part of the shoes which is behind the operative surface 21 and which terminates in the side face 30, is of such a thickness as to fit in the space between the upper wall 23 and the base 24 of the frame. In order to ensure that the frame and the shoe always take up the same relative positions when the springs 28 are not compressed, and to limit the relative movement of the shoe and frame, adequate limiting means are provided which in the embodiment illustrated take the form of projections 32 formed on the upper face 33 of the shoe, that is to say, the face which contacts with the inner face of the upper wall 23 of the frame, said inner face having grooves 34 cut therein in which the said projections are adapted to move. This construction serves principally to limit the amount of separation between the frame and the shoe. In order to limit the approach of these parts to each other, use is made of the shoulder 35 formed between the portion of the shoe adjacent the operative surface 21 and the portion which includes the side face 30, the first mentioned portion being of sufficient thickness to make contact with the plate 14 and being provided with dove-tails which slide in the grooves 27 above mentioned. The distance between the side face 30 and the shoulder 35 is such that the shoe, when in its normal position (that is to say when the springs 28 are not under compression), extends slightly within the space between the upper wall 23 and the base 24 of the frame, the distance between the free edge of the base 24 and the shoulder 35 being then practically equal to the distance between the edge 22 and the upper edge of the operative surface 21.

Preferably, the slides 18 are also provided with guides 36 mounted on the outer face of the upper wall 23. These guides are intended for guiding the sheets 37 of sheet material to their proper position with respect to the cavity 15.

The forming apparatus 10 is completed by the actuating means for the table and for the slides 18. In the embodiment illustrated, the table is designed to approach and recede from a plane in which the core 17 is situated, but there is nothing to prevent this arrangement from being inverted, that is to say, the table may be kept stationary while the core 17 is caused to recede from or approach it. In both instances the purpose and operation of the slides 18 are the same.

In the majority of cases, however, it is more convenient that the table be the moving part during the body forming cycle. For this reason the apparatus will hereinafter be described as of this latter type but the invention is not intended to be limited thereby to what may be called the reciprocating table apparatus, as it is deemed to include likewise the reciprocating core type since the devising of the requisite changes in the actuating means lies well within the capacity of one skilled in the art of mechanics. It will likewise be readily understood that there are available several types of means for actuating not only the tables but also the slides, whether or not the movements of the latter be made dependent on or synchronized with those of the table.

The nature of the actuating means chosen will depend on the manner in which the forming apparatus is to be used. As already indicated, the apparatus may be used as the lower part of a manually operated press. In this case linkwork may be employed for raising and lowering the table and one or more independent sets of levers may be used for actuating the slides 18, 18a. These latter sets may be independent of each other or only of the linkwork for the table. As an alternative, the linkwork and the levers may be operatively interconnected, so that the workman may actuate the table and the slides 18 by operating a single control lever.

If the forming apparatus is designed to be incorporated in a complete machine intended to operate in an almost completely automatic manner, the same basic system of actuation by linkwork may be adopted. Nevertheless, a greater efficiency and a simpler construction and form of transmission are obtained by adopting a rotary actuation means which, according to the preferred embodiment illustrated in the drawings, is a combination of cams and levers.

The said actuating combination comprises a driven shaft 38 which passes through the hollow pillar 12 and the leg 13 in a direction parallel with the plate 14 and at right angles to the cavity 15. In order to accommodate the said shaft 38 the side walls 39, 39a of the hollow pillar 12 are drilled out to form a pair of bearings 40 (see Fig. 2).

The leg 13, which as best seen in Fig. 4, is formed hollow for lightness has formed in each one of its side walls 41, 41a an elongated slot 42 which permits the passage therethrough of the shaft 38 and the upward and downward movement of the table. Adjacent each lateral face of the hollow pillar 12 and on the outside thereof, the shaft 38 carries a cam member 43, 43a having a cam surface 44 excentric with respect to the shaft 38, and an edge 45 remote from the pillar 12 also forming a cam track.

The plate 14 which extends laterally beyond the hollow pillar 12, carries a pair of cam rollers 46 partially sunk into the face of the plate remote from the one having the cavity 15, and mounted on pins 47. Said rollers are designed to remain permanently in contact with, or rather to rest upon the cam surface 44 of the members 43, 43a. For this reason, when the shaft 38 rotates, the cams 43, 43a which rotate with the shaft, first lift the table at a speed which naturally depends on the shape of the surface 44, and then allow it to fall by gravity after the rollers have passed over the portion of the said surface 44 which is furthest from the shaft 38. If desired, a second pair of rollers 46b may be provided (see Fig. 3) mounted on an extension 50a of a pin 50 which extends parallel with the shaft 38 and on the side diametrically opposite to the roller 46, so that the second roller 46b rests against the surface 44 at a lower point.

The pin 50 is secured to the lower end of the leg 13 and rises and falls therewith. In order to permit this, an elongated slot 42a is provided in the side wall of the pillar 12. With this construction it will be understood that the table will be positively pushed downwardly during its descending movement. For the purpose of diminishing the friction and of decreasing the dead load to be raised or supported, it is preferable to provide a counterweight 48 for the table. The said counterweight 48 may be carried by the free end of a counterweight lever 49 which passes through one of the walls of the pillar 12 which are parallel to the shaft 38 and also through the corresponding wall of the leg 13. For the sake of clarity, the walls of the pillar and of the leg through which the counterweight lever so passes will hereinafter be referred to as the rear walls and the end of the apparatus which includes one or other of these walls will be called the rear end. The perpendicularly opposite end, will be called the front end and the side walls and side ends will be distinguished hereinafter as right and left, as seen looking directly at the front end. Thus in Fig. 1 the visible side wall 39 is the right side wall and the visible end is the front end.

The front end of the counterweight lever 49 is pivotally coupled to a pin 50 which passes through the end of the leg 13 remote from plate 14 at a point below the slots 42. The fulcrum of the lever 49 is formed by a rod 51 parallel to the base 11 and fixedly secured to the said lever. The rod 51 is pivotally supported in a pair of bearings 52, 52a (Fig. 4) which extend outwardly from the pillar 12 on each side of an elongated opening 53 formed in the rear wall 54 of the pillar and coinciding substantially with a second opening 55 also elongated, in the rear wall 56 of the leg 13. These openings 53, 55 allow of the necessary play of the lever 49 during the upward and downward movements of the table.

In this form of the forming apparatus, the sliding members 18, 18a are also moved by the cam members 43, 43a through a pair of sectors 57, 58, 57a, 58a for each member 18, 18a. These sectors have their curved edges toothed and are articulated at their ends remote from said edges, to lugs 59 projecting outwardly from the side walls 25, 25a of the frames 19, 19a. The said lugs 59 are so positioned that the toothed edges of the sectors 57, 58 or 57a, 58a of each pair are permanently enmeshed. The anterior sectors 57, 57a each carry a vertically depending shaft 60 fixedly secured to them at an intermediate point and passing through a supporting bearing 61 projecting from the side face of the plate 14 and extending to about the level of the point on the cam track 45 nearest to the roller 46, 46a. The free end of the shaft 60 has fixedly secured thereto a radial arm 62 which terminates in a claw 63 within which a small roller 64 is rotatably mounted so as to be permanently in contact with the cam track 45. In order that the roller 64 may be held in contact with the cam track 45, suitable means are provided, as for example, a spiral or coiled spring (not shown) which may be connected between the shaft 60 and a relatively fixed point such as the supporting bearing 61 and may be located within the latter. The other sector 58, 58a of each pair carries firmly mounted thereon at an intermediate point, a supporting pin 65 rotatably mounted in a step-bearing 66 projecting from the side face of the plate 14. For the purpose of holding the sheet of material 37 against the core 17 while the table is rising, a supporting plate 67 is provided of a length somewhat less than that of the plate 14, the said plate extending perpendicularly with reference to the plane surface of the plate 14 through a longitudinal slot 68 cut in the lowest part of the cavity 15. The free edge of the plate 67 parallel to the plate 14 has the same configuration as that portion of the operative surface of the cavity 15 which has been replaced by the slot 68. The opposite edge of the plate rests freely on a cam 69 formed or mounted on the shaft 38 at a point immediately below the slot 68. The width of the plate 67 measured in the direction of the height of the pillar 12 is such that, when the core 17 is in its operative position, the free edge of the plate 67 will normally be at a distance from the surface of the core equal to the thickness of the sheet material. The cam 69 is practically circular but has a slight depression formed in it so as to allow the supporting plate 67 to be lowered a short distance while a new piece of sheet material is being fed into the apparatus. When the new sheet has been properly placed and the core 17 is in its operative position the plate 67 rises to its normal position, so as again to hold the sheet material firmly against the core and thus prevent it from being displaced while the plate 14 is rising.

For clearness the operation of the forming apparatus, the details of which have just been given, will now be explained before the complete machine is described. Another reason for so doing is the fact that the forming apparatus, even when provided with the system of cams and sectors for actuating it, may be used as a unit, since it need not necessarily form part of a more elaborate machine. Under these conditions the apparatus requires as an accessory a core-positioning device of one of the types hereinbefore mentioned. The sheet material may be fed by hand or by means of any convenient feeding device or apparatus.

As various types of suitable feeding apparatus are readily available, it is considered unnecessary to give a detailed description thereof. The clamping members may likewise be applied and clamped by hand or by means of a suitable device. Nevertheless, and especially in certain cases and for certain types of seams it is preferable to make use of an applying and clamping device for the clamping members, of the kind illustrated in Figs. 15 to 18. This device, which has been designed especially as an accessory of the forming apparatus which is the object of the present invention, is described in detail hereinafter.

With the above remarks in mind and with special reference to Figs. 1 to 5e inclusive, the operation of the forming apparatus illustrated in them will now be described.

It is assumed that shaft 38 is coupled—preferably through a control means which may be a clutch, fast and loose pulleys, an electric control device or the like—to a convenient source of power not illustrated in the said figures. In Figs. 1, 2 and 5a the apparatus is shown with its parts in the positions corresponding to the initial point of the forming cycle.

In these circumstances, the supporting plate 67 is in its upper position and the cam members 43, 43a are in contact with the rollers 46 at that part of the surface 44 which is nearest to the shaft 38. The cam track 45 is so arranged with respect to the cam surface 44 that at the initial point of the forming cycle the roller 64 is in contact with a portion of an idling stretch of the cam track 45, said stretch being in a plane perpendicular to the shaft 38 and at a minimum distance from the corresponding side wall of pillar 12.

Immediately after the shaft 38 has commenced to rotate, the depression of the cam 69 moves under the supporting plate 67 which drops by gravity to permit the placing of the piece 37 of sheet material. When this has been done, plate 67 returns to its upper position as already explained.

The parts, including now the sheet 37 are at this moment in the position illustrated in Fig. 5a. As the shaft 38 continues to rotate, it carries with it the cam members 43, 43a which smoothly lift plate 14 towards core 17. The sheet 37 which is now resting on the outer edge of the upper walls of the frames 19, 19a between the guides 36, 36a begins to be bent by the thrust of the slides 20, 20a which is exerted along the longitudinal edges of the sheet and in the direction in which the table is moving. This condition is illustrated in Fig. 5b. In the meantime the rollers 64 have continued in contact with the idling part of the cam track 45, so that the slides 20, 20a still remain in their initial positions with respect to plate 14. At a suitable moment, for example a little before the condition of Fig. 5c has been reached, the operative part of the cam track 45 begins to slide past the rollers 64.

Said operative part lies generally in a plane inclined with respect to the shaft 38, so that from its origin at either end of the idling part, the operative part of the track slopes away from the corresponding side wall of the pillar 12. Thus, the operative part acts to push the arms 62 outwardly from the pillar 12 at first gradually and subsequently for a brief time interval at a more rapid rate. The outward movement of the arms 62 causes shafts 60 to rotate in their bearings 61 in opposite directions and in such wise as to move the toothed edges of the sectors 57, 57a attached to the said shafts 60 away from the plate 14. Since these edges are in engagement with the toothed edges of the sectors 58, 58a, the toothed edges of the latter are also caused to move outwardly, the sectors 58, 58a turning on their pins 65, in the opposite direction to that of the corresponding sectors 57, 57a. Since ends of the sectors remote from their toothed edges are coupled to the frames 19, 19a of the slides 18, 18a, these latter, as the sectors move in the manner above described, are pushed inwardly of the plate 14, that is, towards the cavity 15, and therefore, toward the operative position which will be taken up by core 17. This condition is illustrated in the Fig. 5c in which are illustrated the slides 18, 18a shortly after the beginning of their movement toward each other.

As the shaft 38 continues to rotate, the table continues to rise until the entire operative surface of the cavity 15 contacts with sheet 37, which is thus pressed against the core 17 from below by said cavity and from the sides by the shoes 20, 20a of the slides which, when the table comes to the end of its upward stroke will have reached the limit of the inward movement as shown in Fig. 5d.

The part of the cam surface 44 which, when the parts are in the position shown in Fig. 5d, is in contact with the roller 46, is concentric with the shaft 38, so that the table is maintained in its position for a short time. On the other hand, the corresponding portion of the cam track 45 has a more pronounced inclination so as to cause a more rapid rotation of the shafts 60. The shoes 20, 20a being firmly held against the core with the sheet 37 interposed which is now almost completely wrapped around the said core, cannot move any further inwardly with relation to the plate 14, so that under the increased thrust of the sectors due to the said modification of the cam track 45, the frames 19, 19a are forced to move towards the shoes 20, 20a against the action of the springs 28, and thus are caused to clamp the longitudinal edges of the sheet 37 between their edges 22, 22a as shown in Fig. 5e. This position represents the end of the forming cycle as far as the forming apparatus is concerned. The portions of the cam surface 44 and of the cam track 45 which at this moment are in contact with the roller 46 and the small roller 64, are so shaped as to maintain for a short while in their respective inner positions the table and the shoes with their frames while an applying and clamping device indicated at 70 in Fig. 5e for the clamping member is being brought into its operative position.

At the moment when the applying device 70 is about to arrive at the level of the outer face of the upper wall of the frames 19, 19a the return cycle of the forming parts of the apparatus 10 begins, the frames 19, 19a first moving away from the core to permit the applying device to descend a short distance more for the purpose of applying the clamping member (indicated by the reference number 71 in Fig. 5e) to the longitudinal edges 72 of the tubular body which is being formed. Once the strip 71 is in its place, the applying device 70 may then operate to compress or clamp it and thereafter to release the clamping member and withdraw from the core 17. The manner in which these movements are effected will be explained hereinafter when describing the preferred form of the applying device. In the meantime, the shoes are somewhat rapidly withdrawn from the core and the table is similarly lowered to its initial position.

Those skilled in the art will easily understand that these return movements of the forming parts are caused by the configuration of the corresponding parts of the cam surfaces and tracks 44 and 45, which cause the operative parts of the apparatus to move in directions opposite to those hereinbefore described, but in a very similar manner.

Once the applying device 70 has been retracted, the core may be moved from its operative position and replaced by another. Alternatively, the same core may be used for a new forming cycle, it being then necessary first to remove the tubular body which has just been finished.

In the foregoing, reference has been made to the placing of a leaf of sheet material on the apparatus at the beginning of the formative cycle. The said leaf or sheet may be either simple or composed of two or more interconnected layers so that a tubular body having one or more layers may be formed. If the forming is carried out in the manner just described, the layers if there are more than one, must be fastened together in such a manner that they cannot be mutually displaced. Notwithstanding this, it is possible to form by the aid of apparatus in accordance with the present invention, tubular bodies of more than one layer in which the several layers form individual tubular bodies telescoped within each other. This construction will be called a body of independent layers. Alternatively the different thicknesses may be secured together only along the longitudinal seam and by means of the same clamping member. This type will be called a body of semi-independent layers, while the type constructed of a compound sheet will be called a multi-ply body.

The bodies of semi-independent layers are made by utilizing a clamping member of suitable cross-section and employing at least two forming apparatus so that with one apparatus the inner layer (either simple or composed of several plies) may be formed on a core, and the same core covered with the layer thus formed may be passed to the other apparatus in order to have an outer layer applied to it. When it is desired to construct the tubular body of more than two layers, the same core may be passed successively to as many forming apparatus as there are layers.

A description of a preferred embodiment of a complete machine for automatic production of tubular bodies of sheet material, based on the forming apparatus above described will now be given. This machine in the form shown in Fig. 6, is designed for the manufacture of tubular bodies of two semi-independent layers, but as will be seen it may be easily adapted for the formation of two or even three bodies of a single layer (simple or compound) at the same time.

Figure 6:
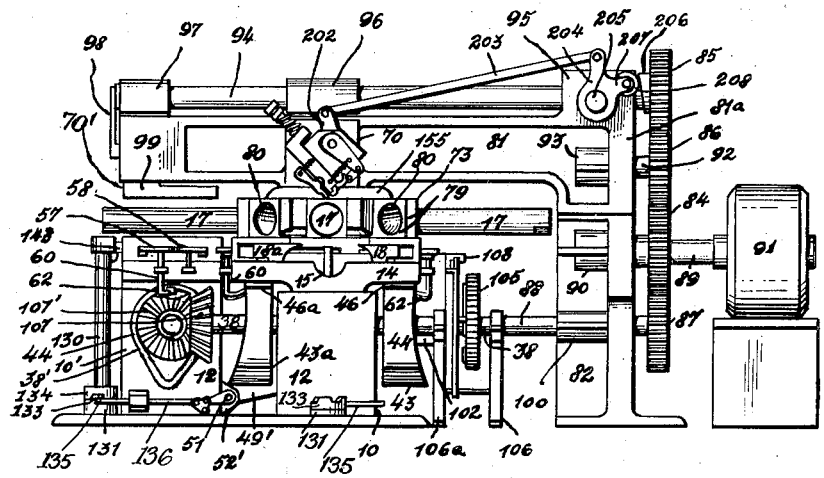
Fig. 6 is a side view of a complete tubular body forming machine constructed on the basis of the apparatus shown in Fig. 1.
Figure 8:
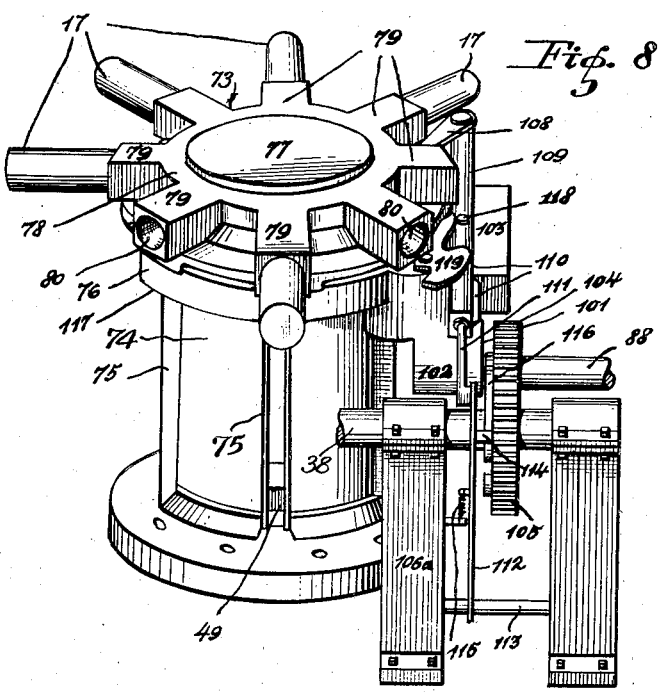
Fig. 8 is a perspective view of a rotary capstan device which forms a part of the machine of Fig. 6.

The machine illustrated in Figs. 6, 7 and 8 comprises two forming apparatus 10 and 10′ arranged at right angles to each other about a core-carrying capstan 73 rotatably mounted on a hollow cylindrical support 74 in the cylindrical wall of which an elongated opening 75 is formed facing each apparatus 10, 10' and extending in an axial direction with respect to the support. Said openings afford a passage-way for the counter-weight levers 49, the counter-weights 48 of which, may be located in the interior of the support. The upper end of the latter is provided with a flange 76 from which a cylindrical boss 77 projects centrally. This boss acts as a journal on which the capstan head 78 may rotate. From said capstan head a certain number of radial bosses 79 project—in the present case eight—and these bosses are axially bored as indicated at 80 to receive the ends of the cores 17 remote from the apparatus 10, 10'. The axial length of the boss 77 is slightly greater than the thickness of the head 78, so that the hub projects beyond the latter so as to serve as an intermediate support for the elongated main arm 81 of the machine, the end 81a of which remote from the apparatus 10' rests on a support 82, and which is designed to carry the applying and/or clamping devices for the clamping members, indicated generally by the reference numbers 70 and 70' in Fig. 6. The said end 81a of the main arm 81 and the support 82 together form a supporting wall for the gearing whereby the motive power is transmitted to the different moving parts of the machine.

The set of gears mounted on the said wall on the side thereof opposite to the main arm 81, comprises a main pinion 84, a driving gear 85 for the device 70', coupled to the pinion by means of an idling gear 86, and a reducing and driving gear 87 for the counter shaft 88. The pinion 84, the idling gear 86 and the driving gear 85 have their shafts in alignment on the centre line of the end 81a of the main arm 81, but the reducing and driving gear 87 has its shaft displaced laterally with respect to said line and towards the apparatus 10 with respect to the machine in general. In order to permit this, the support 82 is somewhat widened as seen in Fig. 7.

The end of the main driving shaft 89 which is nearest to the machine and which carries the pinion 84 is supported in a bearing 90 forming a part of the support 82. The other end of the main driving shaft may form a part of the shaft of a source of motive power such for example as the electric motor 91 or it may be directly coupled to such a device.

The idling gear 86 is fixedly mounted on a short shaft 92 which rotates in a bearing 93 provided near to the lower edge of the end 81a of the main arm 81. In certain cases which will be indicated hereinafter, the driving gear 85 may have a short shaft mounted in a similar form to that of the shaft 92. Nevertheless, in the embodiment of the invention illustrated, the shaft 94 for the driving wheel 85 extends up to the opposite end of the main arm, passing through a bearing 95 near the wheel 85, and an intermediate bearing 96 mounted on, or forming part of the main arm 81, and an end bearing 97 mounted on the main arm 81 near the end remote from the end 81a. The extremity of the shaft 94 which protrudes from the end bearing 97 is operatively coupled to the clamping member clamping device 70' by means of a suitable actuating member, such for example as an eccentric 98, which is for the purpose of raising and lowering the punch 99 of the device 70'.

The counter shaft 88 of the reducing and driving gear 87 passes through an elongated bearing 100 in the widened part of the support 82, and its end remote from gear 87 is rotatably supported in a bearing 101 provided in a depending portion 102 of a shelf 103, which projects from the flange 76 of the support 74 and is directed toward the support 82. Between the latter and the bearing 101, and preferably in proximity to said bearing, the counter shaft 88 carries a transmission gear 104 which is similar to the reducing and driving gear 87 and meshes with a driven gear 105, mounted on the shaft 38 which drives the apparatus 10. In order to support positively the end of the shaft 38 which carries the gear 105, a pair of pedestal bearings 106, 106a may be provided, one on each side of the said gear 105. The opposite end of the shaft 38 which protrudes from the side of the apparatus 10 remote from support 82, carries a conical gear 107 meshing with a similar gear 107' secure on the end of the shaft 38' of the apparatus 10', which is nearest to the last mentioned end of the shaft 38.

The gears 85, 87, 104 and 105 should be so proportioned that shafts 94 and 38 will turn at the same speed for synchronism of cam 206 with forming apparatus 10, and the conical gears 107 and 107' should be of the same size in order that apparatus 10 and 10' may be synchronized.

In order that the cores 17 of the capstan head 73 may be presented successively to the forming apparatus 10, 10' suitable intermittent actuating means is provided, the movements of which are coordinated with those of the said apparatus. The intermittent driving means may be designed in any convenient form, as for example, on the basis of the maltese cross. Nevertheless, a preferred construction is illustrated in Figs. 8 and 9, according to which the intermittent driving means consists of a sliding bar 109 reciprocated from the shaft 38 and provided with a pawl 108 pivoted thereon at 122, the free end of which meshes successively with teeth 117 provided on the face of the head 73 adjacent the flange 76, so that for each complete stroke of the said bar 109 the capstan head 73 will be moved through a predetermined angle in a clockwise direction in the Figs. 8 and 9. In order to lock the capstan in position while the body is being formed on one or the other of the cores, locking means is provided which co-operates with the face of the said teeth remote from the face with which the pawl is in contact. This locking means is preferably in the form of a plane body 119 mounted on a pivot 120 fixed at a convenient point of the face of the shelf 103 which carries the bar 109. The said plane body has an arm 121 directed toward the end of the sliding bar 109 remote from shaft 38, when the said bar is at the beginning of its operative stroke (position illustrated in the Fig. 9). The said arm 121 has on its side remote from the head 73, a cam edge 123 which is in contact with a pin 118 provided at an intermediate point on the bar 109.

The cam edge 123 terminates at its end farthest from the pawl, in an arcuate recess 124 which merges into a straight shoulder 125. From a point on the body 119 almost diametrically opposite to the arm 121, a tongue 126 projects, which is substantially rectangular in plan and which together with the shoulder 125 and the pin 118 forms the effective locking element as will be seen from the following description of the operation of the device.

The sliding bar 109 which lies transversely with respect to the shaft 38, is reciprocated along a groove 110 (Fig. 8) cut in the surface of the shelf 103 parallel to the plane of the capstan head 73, by means of an adjustable rod 111 one extremity of which is coupled to the end of the bar 109 nearest to the shaft 38 and while the other extremity is coupled to the upper end of an oscillating lever 112 the other end of which is mounted on a rod 113 supported between the pedestals 106, 106'.

The lever 112 carries at an intermediate point a rotatably mounted small roller 114 which is pressed by a spring 115 against the edge of a cam 116 on or applied against the face of the driven gear 105 nearest the apparatus 10, so that when the shaft 38 revolves the oscillating lever 112 is alternately moved toward and away from the shelf 103, producing a reciprocating motion of the sliding bar 109 in its groove 110. Beginning at the point in which the parts are ready to commence their operative stroke (position illustrated in Fig. 9), the free end of the pawl 108 is in contact with a certain tooth 117a on the face 117b of the tooth remote from the shaft 38, the pawl being biased toward the head 73 by means of a spring 127 carried by the bar 109, which also has a stop 128 for limiting the outward movement of the pawl, so that the latter, when the bar 109 is moved toward the shaft 38 (downwardly in Fig. 9) can apply a positive thrust to the capstan head 73 which is thus turned through a certain angle—in the case illustrated through an angle of 45°—so as to bring a new core opposite apparatus 10 and carry the core on which a tubular body has just been formed, to an intermediate position between the two apparatus 10 and 10'.

When the bar approaches the shaft 38, the pin 118 moves towards and into the arcuate recess 124. At this point of its travel said pin is so positioned with respect to the pivot 120 of the locking member 119, as upon further movement of said pin 118 towards shaft 38, to cause the locking member 119 to turn (in a clockwise direction in the Figs. 8 and 9) and the tongue 126 to be inserted into the space between the teeth 117 at the moment when the said particular tooth 117a has arrived at such a position that the face 117c of the said tooth, nearest the shaft 38, may come into contact with the edge 129 of the tongue 126 remote from the shaft 38. When the locking member 119 turns on its pivot 120, the recess 124 is moved out of the path of the pin 118 which on arriving at the end of its operative stroke is in contact with the straight shoulder 125 and thus, while the bar 109 is in its position nearest to the shaft 38, prevents the locking member 119 from rotating in the reverse direction to the position illustrated in Fig. 9 so as to free the capstan head.

The cam 116 is so shaped as to maintain the bar 109 in its position nearest to shaft 38 during the forming cycle of the apparatus 10 or 10' and until the respective tables have dropped a sufficient distance for the cores to pass freely over them. At this moment the cam 116 causes the parts controlled by it to return to their original position illustrated in Figs. 8 and 9. During the return movement the pawl 108 strikes against the tooth 117 immediately behind the tooth 117a which it has just left but due to the yielding of the spring 127, the pawl will move toward the bar 109 (to the right in Fig. 9) and, after passing the tooth in question, will return automatically to its outer position under the thrust of said spring. At the same time the pin 118 moves away from the shaft 38, until it strikes the cam edge 123 of the arm 121, which, not being in any way impeded, yields to the push of the said pin and thus causes the locking member 119 to turn on its pivot in a counter-clockwise direction, to its original position and to withdraw the tongue 126 from between the teeth 117, thereby leaving the head 73 free to revolve when the return (operative) stroke is begun, which occurs immediately in order that the cores may be brought into their new positions approximately at the same moment as the tables reach the lowest points of their strokes.

As has already been indicated, it is necessary in the case of certain types of joint for the longitudinal edges of the tubular body—as for instance, the folded seams of sheet metal bodies or applied and partly secured clamping members which have to be flattened on the body—to subject the said edges or clamping members to a relatively heavy blow delivered by a hammer head or the like such as the head indicated at 99 in the Fig. 6. It follows, therefore, that under such conditions the cores are subjected to a sudden combined bending and shear stress which might cause fracture. To avoid this danger, it is advisable in the cases indicated to provide a support for the free end of the core, which support must be capable of moving out of the way of the cores when the latter are in movement.

A support especially adapted for use as an accessory of the apparatus which is the object of the present invention is illustrated in Figs. 6 and 10, the actuating members for the same being shown in Figs. 1, 2, 4 and 6 while in Figs. 11 and 12 is shown the special form of the free end of the cores in order that they may co-operate with the said support. According to the Figs. 6 and 10 the support consists of an upright 130 freely and rotatably supported normally with respect to the base 11 of the apparatus 10 or 10' by means of an axially bored boss 131 formed on or applied to the said base 11. The upper part of the boss 131 is outwardly reduced at 132 to receive the lower annular cam 133 of a pair of cooperating toothed cams the upper cam 134 of which is fixedly mounted on the upright 130. The teeth 133a of the said cams are so formed that if the upright 130 is prevented from turning, it will be alternately lifted and lowered as the lower cam 133 of the coupling rotates on the reduced part 132. From the said lower cam 133 there extends outwardly an arm 135 the free end of which is coupled to one end of an actuating rod 136 (see Figs. 1, 2, 4 and 6) which passes slidably through a supporting guide 137 screwed to one of the side faces—for example the right hand side face—of the pillar 12, and the other end of which is coupled to one of the arms of a bell-crank lever 138 pivoted on a pivot 139 which projects laterally from the said face of the pillar 12. The other arm of the lever 138 is coupled to the free end of an actuating arm 140 fixedly mounted on the free end of the rod 51 which serves as a fulcrum for the counterweight bar 49 to which it is secured.

The upright 130 (Fig. 10) carries on its free end remote from the boss 131, a rectangular head 141 which has on its face remote from the upright a rectangular opening 142 adapted to receive a suitably shaped portion of the free end of the cores. When the upright is placed in the boss 131, the said head 141 will lie between a pair of lugs 143 which project at a convenient height from the front face of the plate 14 (Fig. 4) and prevent the rotation of the upright and force it to rise and fall in response to the oscillations of the lower cam 133. These oscillations are caused by the oscillation of the rod 51 which in its turn is due to the up and down movements of the counterweight bar, as will readily be seen. The actuating arm 140 fixed on the rod 51 transmits the oscillation of the latter through the bell-crank lever 138 to the actuating rod 136 which therefore causes the arm 135 which projects from the lower cam 133 to oscillate, the parts being so proportioned that the angular movements of the arm 135 are of a sufficient amplitude for the teeth of the lower cam 133 to be disengaged from the spaces in which they normally rest and to be positioned below the teeth of the upper cam 133a, thus raising the upright, in order that the bottom of the rectangular opening 142 may come into contact with the lower portion of the free end of the corresponding core.

As already mentioned, the said free ends of the cores are given a special configuration to permit them to enter the opening 142. This configuration is illustrated in Figs. 11 and 12 from which it is seen that the lower half of the cores is so shaped as to provide a substantially rectangular portion 144 of a width equal to that of the opening 142 and at such a height that when the upright 130 is at its maximum elevation, the flat lower face 145 of the portion 144 will be at the same level as that of the bottom of the opening 142. The specially formed part is also utilized to ensure that the core is centralized perfectly with respect to the recess 15, a centralizing part 14b (Fig. 1) suitably recessed at 14c to be a close fit for the shaped end of the cores being applied to the front face of the plate 14.

The movements of the upright 130 and of its actuating parts are coordinated with those of the combined machine so that the upright may arrive at its highest position after a core covered with a tubular body which has been formed and clamped but not finished has been positioned over the table at which it is to receive the flattening blow on its joint and before the hammer has operated, so that the core will be supported at its free end at the moment when it receives the hammer blow.

As will be readily understood by those skilled in the art, because the sheet material is bent tightly around the core and is under circumferential tension during a part of the forming operation, the tubular body when finished will be a relatively tight fit on core, so that it is difficult—especially in the cases of bodies of semi-independent layers the inner layer of which is very thin, or of metallic sheets—to remove the body from the core without damaging it. For this reason, it is convenient to provide slackening means whereby a certain amount of play, however slight it may be—may be produced between the inner layer of the finished body and the surface of the core. As seen in Figs. 11 and 12, the said slackening means, according to the present invention, is in the form of an elongated wedge 146 slidably mounted in an inclined groove 147 which extends longitudinally of the core. The depth of the groove 147 decreases towards the free end of the core, and the wedge 146 is provided with lateral flanges 148 which move in suitable guide slots formed in the side walls of the aforesaid groove, and thus support the wedge at the same time that they permit it to be withdrawn from the said free end. To facilitate this operation, the wedge 146 is provided, near to the end of the core remote from its free end, with a pin 149 which projects laterally and passes through a somewhat elongated opening 150 made in the thickness of the core near its rear end. The said pin 149 may be coupled to one end of a slackening lever 151 pivoted at an intermediate point on a pivot 152 provided on the surface of the core, and normally held in such wise that the wedge 146 will be maintained in a forward position, by means of a spring such as the spring 153 which extends between the lever 151 and a convenient point of the capstan head which carries the core. The free end of the lever may carry a roller 154 designed to co-operate with an adequate projection (not illustrated) provided on a relatively fixed part of the machine, as for example, the intermediate foot 155 of the main arm 81 (Fig. 6) to move automatically the lever 151 from its normal position to a position in which the lower end will move the wedge away from the free end of the core. Therefore, the outer longitudinal surface of the wedge—which complements that of the grooved core when the wedge is completely advanced—is retracted with respect to the surface of the core and consequently reduces somewhat the effective perimeter of the core, thus reducing the tension on the finished body, which may now be separated from the core by means of any suitable device, without danger of damaging the layers of the said body.

Figure 14:
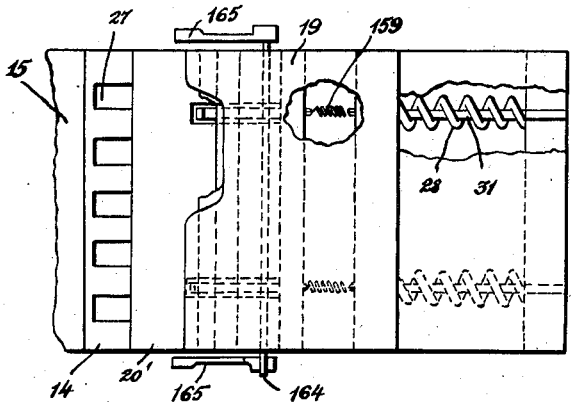

For certain types of longitudinal joints for the tubular bodies, it is highly desirable that the margins of the leaf or sheet bent or wrapped around the core be presented to the clamping member applying device or the device for uniting the margins, in an inclined position with respect to the common plane containing the axis and the line of joint. In such cases it is convenient to use a pair of sliding members of the same general construction as that of the members 18, 18a, but modified as indicated in the Figs. 13 and 14. According to this modification, the part of the upper wall 23' of the frame 19' which in the above described form of the member rests on the upper surface of the shoe 20', is raised with respect to the latter to permit of the interposition of an auxiliary piece 156 provided at the end remote from the cavity 15, with a stop 157 which extends from the upper surface of said piece and is adapted to slide in a blind groove 158 formed in the inner face of the said upper wall 23'. The auxiliary piece is normally held in a withdrawn position, that is to say, with the stop 157 at the part of the blind groove 158 remote from the cavity 15, by means of a tension spring 159 which extends between the rear end of the part 156 and a fixed point inside the frame 19'. On its lower face—that is to say, the face opposite to the one which carries the stop 157—the part 156 has a slot 160 adapted to co-operate with a detent 161 pivotally mounted in a hollow 162 formed in the upper part of the shoe 20', to hold the part 156 in an advanced position with respect to the cavity 15, while the frame 19' is being withdrawn at the conclusion of the forming cycle as will be seen later. In order that the margins of the bent sheet may be guided to the inclined position alluded to, the inner edge 22' of the upper wall 23' of frame 19' is inclined as seen in Fig. 13, it being understood that the corresponding edge of the other frame of the pair is inclined in a direction parallel to that of the edge 22'. The corresponding edge 163 of the auxiliary part 156 has the same inclination as the respective edge 22', and normally the part 156 is so positioned that the edge 163 forms a continuation of the edge 22'.

The rod 164 on which the detent 161 is mounted, goes through the shoe 20' throughout its entire length, protruding at the front and back ends of the same, where the said rod has fixedly mounted upon it a small lever 165 (Fig. 14) which on being depressed, causes rod 164 to rotate for the purpose of removing the detent 161 from the slot 160. In order that the small lever or levers 165 may be depressed at the proper moment, a thrust member 166 may be provided as indicated in broken lines in Fig. 15 where it is shown mounted on the front end (and also at the back end if so desired) of the clamping member applying and clamping device.

The modified type of slides just described is designed to be moved toward and away from the cavity 15 by means of the same actuating devices above described with reference to the normal slides. The movements of the modified slides are, during the first parts of the forming cycle, as before, the advancing thrust being transmitted directly to the frames in the manner above indicated and by means of the springs 28 to the shoes, so that the parts which at the beginning of the movement of approach toward the cavity 15 are in the relative positions shown in Fig. 13, may keep those relative positions and move forward together as a whole. When the shoe 20' is stopped by the covered core, the frame 19' continues to approach the cavity 15, compressing the springs 28 and carrying with it the auxiliary piece in the relative position as shown in the drawings. As the part 156 is thus moved forward it first depresses the detent 161 which only returns to its normal position when the slot 160 has come opposite it. This occurs when the frame and the auxiliary part 156 have come to the end of their movement toward the cavity 15, the part 156 being thus positively held in operative position with respect to the edges of the bent sheet, while the frame 19' can be independently withdrawn. This occurs when the applying and clamping device is about to slide the clamping member on to the edges of the bent sheet. At that moment the frame 19' is pushed backwardly with respect to the cavity 15 by the springs 28 and at the same time pulled in the same direction by means of the sectors actuated by the cam track as above described, thus permitting the clamping member applying device to slide the mouth of the clamping member over a portion of the margins which are then held partly between the edges 163 of the parts 156 and partly between the sides of the clamping member. As the frame 19' is withdrawn from the cavity 15 the springs 159 of the part 156 are extended so that a pull is exerted on the latter which would withdraw it from cavity 15 were it not for the engagement of the detent 161 in the slot 160. At the moment when the device for applying the clamping members has slid the mouth thereof over the margins of the bent sheet, the thrust member 166 comes into contact with the levers 165 and depresses them, thus withdrawing detent 161 from slot 160 and releasing part 156 which under the pull of the spring 159 is moved rapidly away from cavity 15 to its original position with relation to the frame. The device for applying the clamping member may now lower the clamping member so that it completely embraces the margins. The remaining movements of the modified slides are the same as those described in the first part of this specification.

The machine just described is designed to furnish finished tubular bodies, that is to say, having the joint between the longitudinal edges finished and flattened. The nature of this joint will depend greatly on the material of the sheets which are used to form the body. In the case, for example, of tinned sheet iron, the joint may be formed by overlapping the edges and then if desired, soldering them. If the body is formed of paper of one or two layers, the joint may be made by the aid of an adhesive material such as glue or solid paraffin. Both in the latter case, and when other non-metallic sheets are used such as cellophane, a strip of a more rigid material, generally a strip of tinned sheet iron, is frequently used as a clamping member which is applied to the longitudinal margins and the joint is then flattened, rolled, folded or soldered. For this reason, the machine above described may be provided with any convenient type of device for producing any one of the kinds of joint above mentioned. It is preferred, however, to provide the machine with a device for making joints with an applied strip or clamping member, constructed so as to co-operate perfectly with the other parts of the machine and adapted to be actuated directly from the main drive. A device of the kind which in the foregoing part of this specification has been described and called clamping member applying and clamping device, is illustrated in Figs. 15 to 18, in which by way of example it is shown fitted with jaws adapted for applying and clamping strips of the kind having one or more longitudinal channels and lateral flanges. Those skilled in the art will understand that with the corresponding modifications introduced in the holding means (the jaws) the device illustrated in Figs. 15 to 18 may easily be adapted for applying and closing other types of strips.

Figure 15:
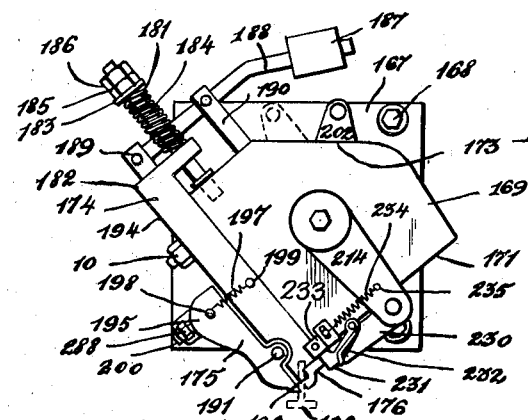
Fig. 15 is a front view of a clamping member applying and securing device shown in Fig. 6.
Figure 17:
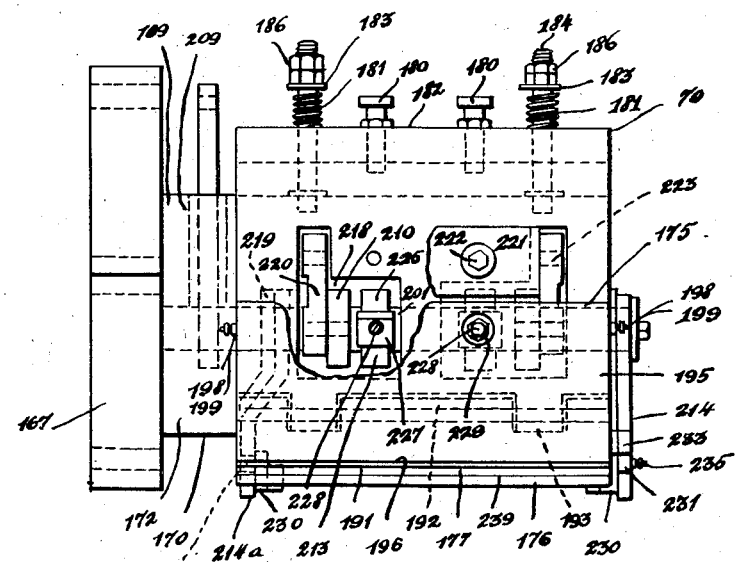
Fig. 17 is a side view of the same device seen from the right in the Fig. 16.
Figure 18:
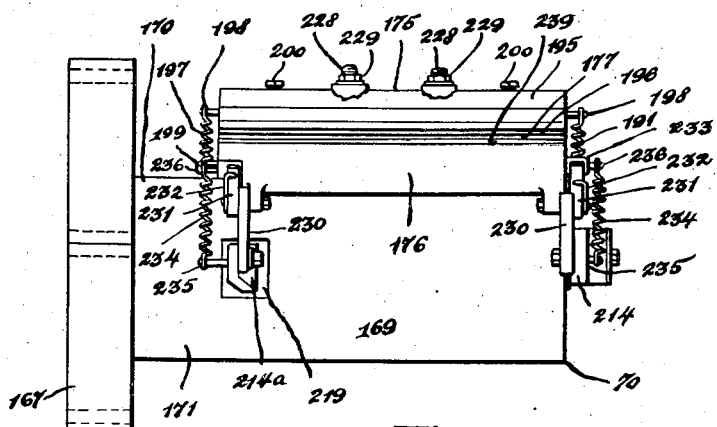
Fig. 18 is a plan view of the same seen from below in the Fig. 16.

As seen in Figs. 15, 17 and 18, the clamping member applying and clamping device comprises a square base 167 which is designed to be fixedly mounted by aid of the bolts 168 on the main arm 81 of the machine (Fig. 6) and which carries a fixed body portion 169 the cross section of which is substantially rectangular with one bevelled corner. The diagonals of the body portion are displaced approximately 45° with relation to those of the base, so that when the latter is mounted on the main arm 81 with two edges parallel to the surface of the plate 14 but transverse to the cavity 15, the line 170 formed by the junction of two of the perpendicular faces of the body portion, and diagonally opposite to the bevelled corner, will extend parallel with the axis of the cavity 15. The said line will be hereinafter called the "lower edge 170 of the body portion", the faces of the body which form the lower edge, being denominated respectively "lower right-hand face 171" and "lower left-hand face 172" as seen when looking at the free end of the said body portion. The surface 173 formed by the bevelling of the upper corner of the body portion will be called the bevelled surface.

On the lower left hand face 172 there is mounted a carrier member 174 on the face of which remote from the face 172 and parallel to the same an oscillating jaw 175 is pivoted, while the lower face of the carrier member, i. e., the face perpendicular to the face 172, carries a sliding jaw 176. Both the carrier member and the sliding jaw are secured to their respective faces, so that they cannot move away from the said faces in a direction normal thereto but can only slide over the faces, so that the carrier member can only move toward and away from the lower edge 170, while the sliding jaw does the same with respect to the lower edge 177 of the carrier member remote from the body portion and parallel to the lower edge 176 of the latter. For example, the coupling between the carrier member and the body portion and between the sliding jaw and the body portion may be by means of the dove-tails 178, 179 (Fig. 16) which slide in grooves cut in the respective surfaces. The carrier member 174 which has a cross section practically in the form of an inverted L, may be provided with adjustable stop screws 180 for limiting its approach toward the lower edge 176, the said stop screws being adapted to make contact with the upper left-hand face of the body portion. Preferably, the parts are so arranged that the carrier member tends to fall by gravity toward the lower edge 176, but if necessary—as for example when the carrier member is made of a material of a small specific weight—means may be provided for producing a positive thrust to assist gravity. In the example illustrated, this positive thrust means is in the form of compression springs 181 which bear at one end against the outer surface 182 of the short arm of the carrier member and at the other end against a disc 183 carried by a rod 184 which is surrounded by the spring 181 and passes freely through the said short arm, one end of the rod being fixedly secured to the body portion and the other being provided with a nut 185 and lock-nut 186 which permit the pressure of the spring 181 to be adjusted. For the purpose of reducing the load on the actuating parts of the device, the carrier member may be provided with counter-weights 187 carried by arms 188 which are pivoted on the said member (or on a pin 189 mounted thereon) and are fulcrumed on a lug 190 projecting from the body portion.

Figure 16:
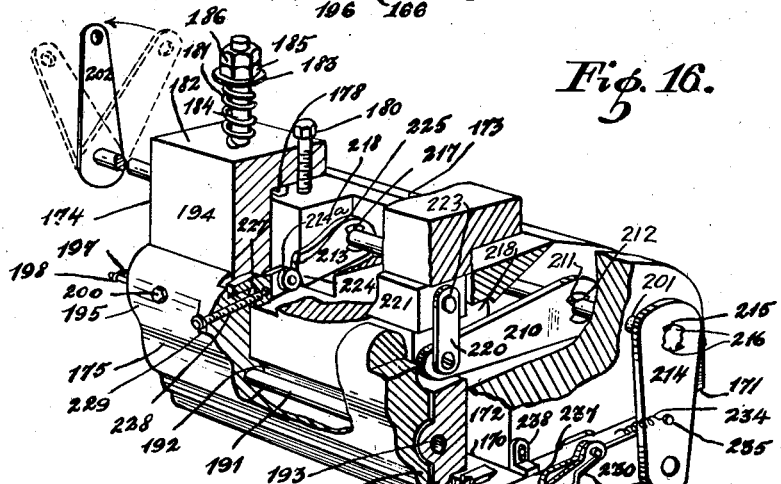
Fig. 16 is a perspective and part sectional view of a clamping member applying and securing device of the type illustrated in Fig. 15.

The oscillating jaw 175 is rotatably mounted on a shaft 191 which passes through a curved protuberance 192 formed on the surface of the jaw adjacent the carrier member and is supported at suitable points by bosses 193 formed on the lower part of the face 194 of the carrier member remote from the face 172. The surfaces of the oscillating jaw and of the carrier member which face each other, are suitably recessed to accommodate the protuberances and the bosses as seen in Fig. 16. The shaft 191 passes through the oscillating jaw longitudinally in the neighbourhood of the lower end of the latter, the upper part of which is thickened as is seen in 195, so that the oscillating jaw 175 tends normally to turn by gravity in a counter-clockwise direction in Figs. 15 and 16, so as to bring its operative lower end into contact with the lower edge 177 of the carrier member. In order to counteract this tendency tension springs 197 may be provided extending between studs 198 fixed on the jaw 175 and similar studs 199 fixed on the carrier member, so that normally in the assembled device there is a certain clearance between the lower edge 196 of the oscillating jaw and the edge 177 of the carrier member, which may be adjusted by means of set-screws 200 which pass through the said jaw near its upper end and bearing against faces 194 of member 174.

The actuating parts of the clamping-member applying and clamping device will now be described, with special reference to Fig. 16 in which a single set of the said parts is illustrated, it being understood, however, that as seen in Figs. 17 and 18 the said parts may be duplicated or multiplied so as to obtain a better distribution of the forces and stresses.

As principal driving element there is provided a shaft 201 which passes through the body 169 perpendicularly with respect to the base 167 and which carries fixedly mounted near its end adjacent said base, a control lever 202 adapted to be coupled to a connecting rod 203 (see Fig. 6) articulated to a bell-crank lever 204 pivoted on the pivot 205 which projects laterally from the main arm 81 carrying the driving gear 85. The said lever 204 is adapted to be oscillated, in a plane including the rod 205 and control lever 202, by means of a cam 206 mounted or formed on the face of the driving gear 85 adjacent the main arm 81, and with which the second arm 207 of the lever 204, which may be provided with a cam roller 208, is normally held in contact by means of appropriate springs (not illustrated). In its normal or idle position, the lever 202 is directed away from the carrier member 174 (towards the right in Figs. 15 and 16) and has a comparatively small angular movement limited by the extent of a slot 209 transverse to the body portion through which the said lever extends outwardly from the said body portion.

A lifting arm 210 is mounted on the shaft 201 and has a hole through which the shaft passes and which is enlarged over two diametrically opposite areas to provide a pair of substantially sector shaped openings 211 which receive a pair of sectorial splines 212 integral with the shaft and of a circumferential length less than that of the openings 211. The shaft also carries a cam arm 213 and a jaw retracting arm 214. The latter has sectorial openings 215 similar to those of the lifting arm 210 in which splines 216 similar to splines 212 enter. The cam arm 213 likewise has sectorial openings but the corresponding splines 217 fill them completely so that the cam arm may be considered as circumferentially fast on the shaft and compelled to rotate together with the latter.

The lifting and cam arms are located in the thickness of the body portion in which chambers 218 requisite to receive and permit movement of the said arms are provided. The jaw retracting arms 214 may both be placed on the outside of the body portion or, as shown, only the front one may be so placed while the rear one extends through a passage 219 formed in the thickness of the said body portion.

The end of the lifting arm 210 remote from the shaft 201 is coupled to the carrier member by means of a link 220 and a block 221 secured to the carrier member by screws 222, and provided at its ends with trunnions 223 which receive the ends of the links 220 remote from the lifting arms 210.

The free end of the cam arm 213 is formed to have an edge 224 substantially concentric with the shaft 201, but provided with a raised portion 225 near the upper end of said edge. The said edge 224 co-operates with a cam roller 224a carried by a fork 227 which is adjustably screwed to the inner face of the oscillating jaw 175—that is, to the face adjacent the carrier member 174—by means of the screw 228 which passes through the thickness of the said jaw and is provided with a lock-nut 229 for the purpose of permitting the adjustment of the fork 227, from without.

The jaw retracting arm 214 which normally extends in a direction perpendicular to the lower right hand face 171 of the body portion, has its end remote from shaft 201 coupled to the sliding jaw 176 by means of a connection member 230, to which a detent finger 231 normally spring-biased in an upward direction by means of a spring 232 is pivotally mounted. When the operating lever 202 is in its idle position the tip of the detent finger 231 rests on the lower surface of the long arm of the carrier member 174 or on a lateral extension 233 thereof (see Figs. 15, 17 and 18). The jaw retracting arm 214 is biased towards an advanced position in which the sliding jaw 176 is nearest to the lower edge 177 of the carrier member 174, by means of a tension spring 234 which extends between buttons 235 and 236 mounted respectively on the jaw retracting arm and the carrier member. The same lower edge 177 of the carrier member serves as a limit to the forward movement of the jaw retracting arm since it projects in the form of a depending rib from the end of the long arm of the said member, and thus serves as a stop for the body of the sliding jaw. There is also provided a rest 237 for the tip of the detent finger 231, the purpose of which will be hereinafter explained, and which in the example illustrated takes the form of an L-shape piece 238 screwed to the front face of the body portion 169. When the jaw retracting arm 214 is located within the body portion, as is the case for the arm 214a nearest to the base 167 (see Figs. 17 and 18) it is unnecessary to provide the piece 238 since the lower right hand face 171 of the body portion serves as a rest, as will be seen in the course of the description of the operation of the device.

When the operating lever 202 is in its idle position, the concentric part of the edge 224 of the cam arm 213 is in contact with the roller 224a, so that the latter—and therefore the upper part of the oscillating jaw 175—is in its position of maximum approach toward the shaft 201 for a given adjustment of the screw 228, the roller 224a being urged against the said edge 224 by the springs 197. Consequently the lower edge 196 of the oscillating jaw 175 is held away from the lower edge 177 of the carrying member, so that the channel of a strip to be applied to the tubular body may be inserted in the space or clearance thus provided, one flange of said strip then extending outwardly and bearing against the lower edge 196 of the oscillating jaw 175.

The lifting arm 210 is then in an angular position in which the end articulated to the link 220 is at the highest point of its stroke, the carrier member being thus raised with respect to the body portion, so that the adjustable stop screws 180 are clear of the upper left hand surface of the body portion and the springs 181 (if any) are compressed. This is due to the fact that the splines 212 of the shaft 201 are at the end of their clockwise movement and consequently in contact with the shoulders of the openings 211 so that they prevent the descent of the carrier member.

As the sliding jaw 176 is attached to the carrier member, it will follow the latter in its downward and upward movements and under the conditions indicated above, will be in its most elevated position that is, nearest to the lower right hand face 171 of the body portion. The parts are so proportioned that at this juncture the plane surface formed by the end of the long arm of the carrying member 174 or at least the part of the latter on which the tip of the detent finger 231 rests will not project beyond the lower right hand face 171 of the body portion 169, or at least beyond the rest 237, and preferably is flush with the same. It will readily be understood that the shoulders of the openings 211 of the lifting arm 210 which at that time are in contact with the splines 212 exert a pressure on the latter due to the weight of the carrier member and the thrust of the compressed springs 181, if any. The said pressure is so directed that if the lifting arm were not impeded by the splines 212, it would rotate in a counter-clockwise direction, thus permitting the carrier member 174 to be lowered until the stop screws 180 come into contact with the upper left hand surface of the body portion 169. Consequently, when shaft 201 rotates in a counter-clockwise direction, the lifting arm follows it maintaining the said shoulders of the openings 211 in contact with the splines 212 so that there will be a free space in front of the splines in the direction of their rotation, and thus, when the carrier member 174 is stopped in its downward movement by the stop screws 180, the shaft 201 may continue rotating until the splines 212 come into contact with the shoulders of the other end of the openings 211.

While the operating lever is in its idle position, the jaw retracting arm 214 is held at the end of its stroke nearest to the carrier member under the pull of springs 234 which are almost completely contracted, the sliding jaw 176 and the detent finger 231 being in the positions before described. Under these conditions there is a clearance between the lower edge 177 of the carrier member 174 and the projecting lip 239 of the sliding jaw, in which clearance a second flange or channel of the strip may be positioned so as to be supported by the said lip.

It will be noted that the springs 234 tend to cause the jaw retracting lever to turn in a clockwise direction, whereby the shoulders of the openings 215 corresponding to those of openings 211 which are in positive contact with the splines 212, tend to move away from the shoulders 216. The openings and splines are so proportioned that when the parts are in the positions indicated, there will also in the case of the openings 215 of the jaw retracting arm 214, be a space or clearance in front of the splines 216 in the same direction as for the splines 212, so that when the shaft 201 revolves in a counter-clockwise direction, the jaw retracting arm 214 will not move until the splines 216 have reached the shoulders of the openings 215 which limit the said space. Then only can the shaft 201 begin positively to cause the jaw retracting arm 214 to rotate against the action of the springs 234 which are stretched and thus maintain the said shoulders of the openings 215 in positive contact with the splines 216.

The relation between the openings 211 and 215 and their corresponding splines 212 and 216 is such that the free spaces of the openings 211 have a circumferential length somewhat greater than that of the free spaces of the openings 215, so that when the splines 216 have arrived at their operative position with respect to the jaw-retracting arm 214, the splines 212 will still be enabled to move in spite of the fact that the carrier member 174 is at that time prevented from further downward movement. Thus the shaft 201 continues to rotate so as to move the jaw-retracting arm 214 towards its position remote from the carrier member 174.

When the operating lever 202 is moved in a counter-clockwise direction—operating stroke—under the push of the cam 206 transmitted by means of the connection rod 203, the cam arm 213 turns together with the shaft 201 but as at the time the concentric part of the edge 224 is in contact with the roller 224a, no thrust is exerted on the oscillating jaw 175. The carrier member 174 falls under gravity with or without the aid of the springs 181 thus causing the lifting arm 210 to follow the splines 212 while the latter are moving away from their initial position. In the meantime the splines 216 are turning freely in the openings 215 towards their operative position with respect to the jaw retracting arm 214.

When the carrier member has dropped sufficiently for the stop screws 180 to come into contact with the left hand upper surface of the body-portion in which position the strip will have been applied to the edges of the formed body and the edge 196 of the oscillating jaw as well as the lip 239 of the sliding jaw are in their position of maximum approach to the core—the raised portion 225 of the edge 224 of the cam arm 213 is just beginning to move past the roller 224a thus pushing the upper end of the oscillating jaw outwardly against the tension of the springs 197, thereby causing the lower edge 196 of the said jaw to move toward the edge 177 in order to compress the channel of the strip firmly against the margin or margins which are in the said channel, and thus clamp the strip on the formed body.

As at this moment the lip 239 of the sliding jaw is still under the second flange or channel of the strip in a position to support the same, it follows that the carrier member cannot in these circumstances rise without pulling away from the body the applied strip together with the edge or edges enclosed in the flattened channel. Therefore, as soon as the strip has been clamped as has just been indicated, the splines 216 commence to come into play for causing rotation of the jaw retracting bar 214 in a counter-clockwise direction thus withdrawing the sliding jaw 176 from the edge 177.

From the foregoing it will have been seen that at this moment the lower edge of the long arm of the carrier member (with which, or its extension 233 the tip of the detent finger 231 has so far continued in contact) is now projecting beyond the lower right hand face 171 of the body portion 169, so that when the sliding jaw 176 is withdrawn from the edge 177, the detent finger which is carried in the same direction by the connection member 230, and is then no longer impeded by the said lower edge of the long arm, turns in a clockwise direction, under the action of the spring 232, to cause its tip thus to approach the level of the lower right hand face 171, which at that moment may be considered as higher than that of the said end of the long arm. The tip of the detent finger 231 now lies against the rest 237 which is also at a higher level than the said lower end. At this juncture the free space of the opening 211 appears back of the splines 212.

The operating lever 202 now begins its return stroke and rotates clockwise thus causing the splines 216 to move away from their operative position with respect to the opening 215 of the jaw retracting arm 214, which, under the pull of the springs 234 rotates in the same direction as the shaft 201 to return to its original position. As a result of the difference in level between the lower edge of the long arm of the carrier member and the rest 237, the detent finger 231 in moving toward its original position is stopped by the projecting part of the said long arm, so that neither the jaw retracting arm 214 nor the detent finger 231 can return to their initial position until the carrier member has moved upwardly. The arrangement of the parts is such that the detent finger is thus held in a position in which the lip 239 of the sliding jaw is held far enough away from the edge 177 of the carrier member 174 to leave the respective flange or channel of the strip completely free and thus permit the carrier member to rise without damaging the strip or the tubular body.

As the shaft 201 begins to rotate in its return movement, the raised part 225 of the edge 224 of the cam arm 213 moves away from the roller 224a thus allowing the oscillating jaw to return to its initial position under the pull of springs 197 and to liberate the flattened channel of the strip. Upon rotation of the oscillating jaw to its initial position, the splines 212 again come in contact with the shoulders of the openings 211 and thus impart a clockwise movement to the lifting arm so as to raise the carrier member towards its initial position, thus removing the lower edge 177 and the oscillating jaw 175 from the tubular body to which the clamping member or strip has just been applied. The carrier member when rising carries with it the sliding jaw 176 which is still partially withdrawn. When the lower surface of the long arm of the carrier member comes flush with the resting surface 237, thus removing the obstacle to further movement of the detent finger 231, the jaw retracting arm 214 is again moved clockwise under the pull of the spring 234 to bring the sliding jaw into its initial position. When this has been done, all the parts will again be in their initial positions and the clamping member applying and clamping device will be ready to commence another operative cycle.

Naturally, it is understood that the lower edge 177 of the carrier member as well as the lip 239 of the sliding jaw 175 and the lower edge 196 of the oscillating jaw have a length at least coextensive with the longitudinal margins of the tubular body and may, if desired, project beyond the latter at one or both ends.

The clamping element applying device may also be modified to serve at the same time as a forming element of a part of the tubular body, the device being in such instances provided with the necessary forming surfaces or flanges alongside the applying organs.

As will be apparent from the foregoing description, the clamping element applying and clamping device constructed as illustrated in Figs. 15 to 18 will apply and clamp a U-section strip or one channel only of a two-channel strip. It will therefore be understood that both margins of the sheet material of the tubular body will be introduced together into one channel. Preferably in such cases the margins are introduced at an angle with respect to the radial plane passing through the line of joint, and modified slides as shown in Fig. 13 are used. After the clamping strip has been applied and clamped to the margins by the device shown in Figs. 15 to 18, the strip is flattened against the tubular body by the punch 99 of device 70' (Fig. 6) under which the partly finished tubular body is brought by further rotation of the capstan head 73. A clamping strip of the type described in United States Patent No. 1,989,075 may be applied by means of the device of Figs. 15 to 18. If such a strip, which has a pair of inner and a pair of outer channels is used, the margins of the sheet material are both introduced into one of the inner channels; the walls of this channel only are compressed by the jaw 175. Thereupon the partly finished tubular body may be carried as stated to a position below the punch 99 and have a further (outer) layer of sheet material applied to it by apparatus 10' (Fig. 6), the margins of the sheet being in this instance introduced into the outer channels of the strip, for example by the free tips of the shoes of slides 18 and 18a, whereupon the strip is flattened to secure the last mentioned margins by punch 99.

It should be noted that the shoes of the slides of the forming apparatus may, particularly in connection with the production of certain polygonal contours, be conveniently composed of two or more parts the separation being along longitudinal planes preferably parallel to the table top.

I have, on the basis of my novel forming apparatus, provided a complete machine capable of producing finished tubular bodies of sheet material, and from the practical tests made a machine of this type has been shown to be capable of delivering the tubular bodies completely finished, at the rate of 3000 to 3600 per hour. Furthermore, the essential and characteristic element of this machine—which is the forming apparatus—may be utilized independently of the other organs or with the clamping member applying and clamping device alone.

It is understood that the present invention is not limited to the embodiment illustrated in the drawings but that various modifications may be made in the construction and parts thereof without thereby departing from the nature and scope of the invention as defined in the appended claims.

What I claim is:

1. A machine for forming tubular bodies by bending sheet material around a core comprising forming apparatus for bending the sheet material, and a core-carrier having a core, said forming apparatus including a plate having an operative surface, a cavity in said operating surface of cross-section geometrically similar to a portion of the transverse contour of said core and equal to the transverse contour of said portion when covered by the sheet material used, a pair of slides slidably mounted on said operating surface on opposite sides of said cavity, said slides having on the side thereof nearest to the cavity a shaped face of cross-section geometrically similar to a fraction of that part of the transverse contour of said core which complements the portion corresponding to the cavity, and on the side remote from the operative surface of the plate a supporting surface for receiving the sheet material prior to its being bent, the said supporting surface being spaced from said core a minimum distance sufficient to permit the insertion of the sheet material between the supporting surface and the core when the latter is in parallel alignment with the cavity and outside of the space defined by said shaped faces and the cavity taken together, actuating means for moving the slides toward and away from said cavity, and operating means for causing between the core on the one hand and the plate with its cavity on the other hand a relative movement of approach and separation in a direction normal to the operative surface of the plate.

2. In a tubular body forming apparatus, a core, supporting means for said core, a plate having an operating surface, means for causing a relative movement of approach and separation between said core and said plate in a direction normal to said operative surface, a cavity in said operative surface, of cross-section geometrically similar to a portion of the transverse contour of said core, a pair of slides slidably mounted on opposite sides of said cavity, said slides each comprising a hollow frame open on the side nearest to the cavity, a shoe slidably mounted within said frame and normally resiliently urged to an advanced position toward the cavity, said shoe having on the side thereof nearest the cavity a shaped face of cross-section geometrically similar to a fraction of that part of the transverse contour of the core which complements the said portion thereof corresponding to the cavity.

3. In a tubular body forming apparatus including a core, a plate having an operating surface and a cavity within said operating surface, a hollow guide pillar, an axial opening in said pillar, a hollow leg depending from said plate, having side-walls parallel to the longitudinal axis of said cavity and slidably mounted in said axial opening, a pair of coaxial elongated slots formed in said side-walls and extending perpendicularly with respect to the longitudinal axis of the cavity, bearings contrived in the thickness of the walls of the pillar, a driven shaft rotatably mounted in said bearings and passing through said elongated slots, a cam fixedly mounted on said shaft on either side of said pillar, a roller rotatably mounted on the face of the plate opposite to the operating surface on either side of said leg, said rollers being permanently in contact with said cams, and driving means for rotating said driven shaft together with the cams, whereby to cause reciprocation of said plate with respect to said core.

4. In a tubular body forming apparatus including a core, a plate having an operating surface and a cavity within said operating surface, a hollow guide pillar, an axial opening in said pillar, a hollow leg depending from said plate, having side-walls parallel to the longitudinal axis of the cavity and end-walls joining said side-walls and perpendicular to said axis, said leg being slidably mounted in said axial opening, a pair of coaxial elongated slots formed in said side-walls and extending perpendicularly with respect to the longitudinal axis of the cavity, bearings contrived in the thickness of the walls of the pillar, a driven shaft rotatably mounted in said bearings and passing through said elongated slots, a cam fixedly mounted on said shaft on either side of said pillar, a roller rotatably mounted on the face of the plate opposite to the operating surface on either side of said leg, said rollers being permanently in contact with said cams, an opening in one of the end-walls of said leg, an aperture coinciding with said opening in the wall of the pillar adjacent said end-wall, a counterweight lever passing through said aperture and said opening, said lever having one end extending into the interior of said leg and connected thereto, and being fulcrumed at a point lying outside of said pillar, and a counterweight mounted on the end of the lever remote from the pivoted end.

5. In a tubular body forming apparatus including a core, a plate having an operating surface and a cavity within said operating surface, a hollow guide pillar, an axial opening in said pillar, a hollow leg depending from said plate, having side-walls parallel to the longitudinal axis of the cavity and end-walls joining said side-walls and perpendicular to said axis, said leg being slidably mounted in said axial opening, a pair of coaxial elongated slots formed in said side-walls and extending perpendicularly with respect to the longitudinal axis of the cavity, bearings contrived in the thickness of the walls of the pillar, a driven shaft rotatably mounted in said bearings and passing through said elongated slots, a cam fixedly mounted on said shaft on either side of said pillar, a roller rotatably mounted on the face of the plate opposite to the operating surface on either side of said leg, said rollers being permanently in contact with said cams, an opening in one of the end-walls of said leg, an aperture coinciding with said opening in the wall of the pillar adjacent said end-wall, a counterweight lever passing through said aperture and said opening, said lever having one end extending into the interior of said leg and connected thereto, a rod parallel to said operating surface extending through said lever and fixedly secured thereto at a point lying outside of said pillar, a pair of bearings rotatably supporting said rod and a counterweight mounted on the end of the lever remote from the pivoted end thereof.

6. In a tubular body forming apparatus including a core, supporting means for said core, a plate having an operating surface, means for causing relative reciprocation between said core and said plate in a direction normal to said operating surface, a cavity in the operating surface of cross-section geometrically similar to a portion of the transverse contour of the core, and a pair of slides slidably mounted on opposite sides of said cavity, said slides having on the side thereof nearest to the cavity a shaped face of cross-section geometrically similar to a fraction of that part of the transverse contour of the core which complements the portion corresponding to the cavity, actuating means for moving the slides toward and away from said cavity comprising a pair of ears projecting laterally from the side of the slide remote from the shaped face, a pair of substantially sector-shape members having their curved edges toothed and articulated at their opposite ends to said ears, depending pivots fixedly secured to said sector-shape members at points intermediate their ends, bearings projecting laterally from the face of the plate parallel to the longitudinal axis of said cavity and rotatably supporting said pivots, the pivot of one sector-shape member of each pair extending through its bearing and carrying on its free end a radial arm whereby said pivot may be rotated, said ears being so spaced from each other that the toothed edges of the sector-shape members of a pair are in permanent engagement.

7. In a tubular body forming apparatus including a core, a plate having an operating surface and a cavity within said operating surface, a hollow guide pillar, an axial opening in said pillar, a hollow leg depending from said plate, having side-walls parallel to the longitudinal axis of said cavity and slidably mounted in said axial opening, a pair of coaxial elongated slots formed in said side-walls and extending perpendicularly with respect to the longitudinal axis of the cavity, bearings contrived in the thickness of the walls of the pillar, a driven shaft rotatably mounted in said bearings and passing through said elongated slots, a cam fixedly mounted on said shaft on either side of said pillar, said cams having each a cam surface surrounding said shaft, a cam track formed on the edge of the cam surface remote from the pillar, a roller rotatably mounted on the face of the plate opposite to the operating surface on either side of the leg, said roller being permanently in contact with said cam surface, a pair of slides slidably mounted on opposite sides of said cavity, said slides having on the side thereof nearest to the cavity a shaped face of cross-section geometrically similar to a fraction of that part of the transverse contour of the core which complements the portion corresponding to the cavity, actuating means for moving the slides toward and away from said cavity comprising a pair of ears projecting laterally from the side of the slide remote from the shaped face, a pair of substantially sector-shape members having their curved edges toothed and articulated at their opposite ends to said ears, depending pivots fixedly secured to said sector-shape members at points intermediate their ends, bearings projecting laterally from the face of the plate parallel to the longitudinal axis of said cavity and rotatably supporting said pivots, the pivot of one sector-shape member of each pair extending through its bearing and carrying on its free end a radial arm, a roller rotatably mounted on the free end of said radial arm, and resilient means for yieldingly urging said arm with its roller against the cam track.

8. In a tubular body forming apparatus including a core, a plate having an operating surface and a cavity within said operating surface, a hollow guide pillar, an axial opening in said pillar, a hollow leg depending from said plate, having side-walls parallel to the longitudinal axis of said cavity and slidably mounted in said axial opening, a pair of coaxial elongated slots formed in said side-walls and extending perpendicularly with respect to the longitudinal axis of the cavity, bearings contrived in the thickness of the walls of the pillar, a driven shaft rotatably mounted in said bearings and passing through said elongated slots, a cam fixedly mounted on said shaft on either side of said pillar, said cams having each a substantially cylindroidal cam surface surrounding said shaft and eccentric thereto, a cam track formed on the edge of said cam surface remote from the pillar and including an idling portion extending in a plane substantially perpendicular to the operating surface and an operative portion lying substantially in a plane inclined to that of the idling portion in such wise that the part of said operative portion farthest from the pillar coincides substantially with the part of the cam surface farthest from the driven shaft, a roller rotatably mounted on the face of the plate opposite to the operating surface on either side of the leg, said roller being permanently in contact with said cam surface, a pair of slides slidably mounted on opposite sides of said cavity, said slides having on the side thereof nearest to the cavity a shaped face of cross section geometrically similar to a fraction of that part of the transverse contour of the core which complements the portion corresponding to the cavity, actuating means for moving the slides toward and away from said cavity comprising a pair of ears projecting laterally from the side of the slide remote from the shaped face, a pair of substantially sector-shape members having their curved edges toothed and articulated at their opposite ends to said ears, depending pivots fixedly secured to said sector-shape members at points intermediate their ends, bearings projecting laterally from the face of the plate parallel to the longitudinal axis of said cavity and rotatably supporting said pivots, the pivot of one sector-shape member of each pair extending through its bearing and carrying on its free end a radial arm, a roller rotatably mounted on the free end of said radial arm, and resilient means for yieldingly urging said arm with its roller against the cam track.

9. In a tubular body forming machine including a core, supporting means for the core, a plate having an operating surface, a cavity formed in said operating surface, and means including a leg depending from said plate and a hollow guide pillar slidably supporting said leg for causing reciprocation of said plate with respect to said core in a direction normal to the operating surface, said core being of length such that when it is aligned with said cavity the ends of the core project beyond said plate, supporting means for at least one end of the core comprising an upright, a head on one end of said upright having a plane portion perpendicular to the axis of the upright, a boss fixedly mounted with respect to the pillar and axially bored to receive the end of the upright remote from the head, and having a reduced portion on which a lower tooth cam is rotatably mounted, an upper toothed arm being fixedly mounted on the upright at a point intermediate its ends, an arm fixedly secured to and projecting laterally from the lower cam, actuating means for oscillating said arm and stop means for preventing rotation of the upright while permitting axial movement thereof.

10. In a tubular body forming apparatus including a plate having an operating surface, a cavity formed in said operating surface and extending lengthwise across said plate, a core of length greater than that of said plate so that when said core is aligned with said cavity the ends of the core project beyond the plate, supporting means for said core, a hollow guide pillar having an axial opening, a leg depending from the plate and slidably mounted in said axial opening, a counterweight lever freely passing through one wall of the pillar and having one end articulated to said leg, a rod fixedly secured to said lever at a point lying outside said pillar, a pair of bearings rotatably supporting said rod, supporting means for a projecting end of the core including an upright, a boss fixedly mounted with respect to said pillar and bored to receive one end of said upright and having a reduced portion, a pair of cooperating toothed cams, one of which is fixedly mounted on the upright while the other part is rotatably mounted on said reduced portion, and an arm fixedly secured to and projecting laterally from the last-mentioned of said cams, actuating means for causing oscillation of said arm comprising a bell-crank lever pivotally mounted on one side of the pillar, a supporting guide secured to the same side of the pillar, a lever fixedly mounted on one end of the rod of the counterweight lever and articulated to one arm of the bell-crank lever, and an actuating bar slidably supported in said supporting guide and pivotally coupled at one end to the second arm of the bell-crank lever and at the other end to the free end of the arm of the last mentioned cam.

11. In a tubular body forming machine including a plate having a plane operating surface and a cavity formed in said operating surface and extending lengthwise across the plate, a support having a flat end lying in a plane parallel to that of the operating surface, a boss projecting from said end, a capstan head rotatably mounted on the boss, a plurality of co-planar cores projecting radially from said capstan head, operating means for reciprocating the plate with respect to the plane of the cores, and means for intermittently imparting a rotary movement to said capstan head through a predetermined angle whereby successively to position the cores in alignment with said cavity.

12. In a tubular body forming machine including a plate having an operating surface and a cavity formed in said operating surface and extending lengthwise across the plate, a support having an end lying in a plane parallel to that of the operating surface, a boss projecting normally from said end, a capstan head rotatably mounted on the boss, a plurality of co-planar cores projecting radially from said capstan head, operating means for reciprocating the plate with respect to the plane of the cores, including a driven shaft parallel to the operating surface and at right angles to the axis of the cavity, a shelf projecting from said support and having an upper surface parallel to the said end of the support, an annular surface provided on the capstan head on the side thereof adjacent the support, said annular surface extending radially beyond the support, a plurality of teeth depending from said annular surface and having leading and trailing faces, a groove in said shelf extending transversely with respect to the driven shaft, a reciprocating bar slidably mounted in said groove, a stop, and a pawl on the end of the reciprocating bar remote from said driven shaft, said pawl being pivotally mounted on the bar and spring-urged at an angle with the bar against said stop so that the free end of the pawl normally is in contact with the trailing face of one of said teeth, a pin projecting normally from an intermediate point of said reciprocating bar and on the side thereof remote from the groove, a locking member pivotally mounted on the shelf between the bar and the capstan head and on the side of the pin remote from the pawl, a tongue projecting from the side of the locking member remote from the pawl, said locking member being adapted to be oscillated by said pin in response to the reciprocations of the bar so as to bring said tongue into and out of engagement with the leading face of one of said teeth, and actuating means connected between the driven shaft and the end of the bar remote from the pawl for causing reciprocation of the bar in response to rotation of the driven shaft.

13. A machine for forming tubular bodies of sheet material of the type in which the joint between the longitudinal edges of the sheet material is made by means of a clamping member applied to and clamped on said edges after the tubular body has been formed, said machine comprising in combination a forming apparatus including a pillar having an axial opening, a plate having a plane operating surface, a leg depending from the face of the plate opposite to the operating surface and slidably mounted in said axial opening, a cavity formed in said operating surface and extending lengthwise across the plate, a pair of slides slidably mounted on the operating surface on opposite sides of the cavity, and actuating means for the plate and the slides including a driven shaft extending parallel to said operating surface and at right angles to the axis of the cavity, and means for operatively connecting said shaft to said plate and said slides, a rotary core-carrier having a circular hole extending axially therethrough, a plurality of cores projecting radially from the core carrier, a support for the core-carrier having a flat end lying in a plane parallel to the operating surface, a shelf projecting laterally from the support and a boss of axial thickness somewhat greater than that of the core-carrier extending from said end and passing through said hole and projecting beyond said core-carrier, an end support, an elongated machine frame arm carried at one end by the end support and at an intermediate point by the portion of the boss projecting beyond the core-carrier, a clamping-member applying and clamping device mounted on said machine frame arm so as to extend above and parallel with said cavity, and driving means for the machine including a driving pinion, a driving gear operatively coupled to the clamping-member applying and clamping device and driven from the driving pinion, a countershaft rotatably supported between said end-support and said shelf, a reducing and driving gear mounted on the end of the countershaft nearest the end-support and driven by the pinion, an idling gear mounted on the countershaft in the neighbourhood of the shelf, and a driven gear secured to the driven shaft and meshing with said idling gear and means for operatively connecting said driven shaft to said core carrier.

14. A machine for forming tubular bodies of sheet material of the type in which the joint between the longitudinal edges of the sheet material is made by means of a clamping member applied to and clamped on said edges after the tubular body has been formed, said machine comprising in combination a forming apparatus including a pillar having an axial opening, a plate having a plane operating surface, a leg depending from the face of the plate opposite to the operating surface and slidably mounted in said axial opening, a cavity formed in said operating surface and extending lengthwise across the plate, a pair of slides slidably mounted on the operating surface on opposite sides of the cavity, and actuating means for the plate and the slides including a driven shaft extending parallel to said operating surface and at right angles to the axis of the cavity and means for operatively connecting said shaft to said plate and said slides, a rotary core-carrier having a circular hole extending axially therethrough, a plurality of cores projecting radially from the core carrier, a support for the core-carrier having a flat end lying in a plane parallel to the operating surface, a shelf projecting laterally from the support and a boss of axial thickness somewhat greater than that of the core-carrier extending from said end and passing through said hole and projecting beyond said core-carrier, an end support, an elongated machine frame arm carried at one end by the end support and at an intermediate point by the portion of the boss projecting beyond the core-carrier, a clamping-member clamping device mounted on said machine frame arm so as to extend above and parallel with the cavity, and driving means for the machine including a driving pinion rotatably mounted on the end of the machine frame arm which rests on the end-support, an actuating shaft journalled in bearings provided at each end of said machine frame arm, a driving gear operatively associated with the driving pinion and fixedly mounted on the end of the actuating shaft nearest the end-support, an elongated hammer head slidably supported in the machine frame arm, an eccentric mounted on the actuating shaft and operatively coupled to the hammer head to cause reciprocation thereof in a plane perpendicular to the operating surface of the plate and passing through the longitudinal axis of the cavity, a countershaft rotatably supported between said end-support and said shelf, a reducing and driving gear mounted on the end of the countershaft nearest the end-support and driven by the pinion, an idling gear mounted on the countershaft in the neighbourhood of the shelf, a driven gear secured to the driven shaft and meshing with said idling gear, and means for operatively connecting said driven shaft to said core carrier.

15. A machine for forming tubular bodies of sheet material of the type in which the joint between the longitudinal edges of the sheet material is made by means of a clamping member applied to and clamped on said edges after the tubular body has been formed, said machine comprising in combination a forming apparatus including a pillar having an axial opening, a plate having a plane operating surface, a leg depending from the face of the plate opposite to the operating surface and slidably mounted in said axial opening, a cavity formed in said operating surface and extending lengthwise across the plate, a pair of slides slidably mounted on the operating surface on opposite sides of the cavity, and actuating means for the plate and the slides including a driven shaft extending parallel to said operating surface and at right angles to the axis of the cavity, and means for operatively connecting said shaft to said plate and said slides, a rotary core-carrier having a circular hole extending axially therethrough, a plurality of cores projecting radially from the core-carrier, a support for the core-carrier having a plane end lying in a plane parallel to the operating surface, a shelf projecting laterally from the support and a boss of axial thickness somewhat greater than that of the core-carrier extending normally from said end and passing through said hole and projecting beyond said core-carrier, an end support, an elongated machine frame arm carried at one end by the end support and at an intermediate point by the portion of the boss projecting beyond the core-carrier, a clamping member applying and clamping device mounted on said machine frame arm so as to extend above and parallel with said cavity and driving means for the machine including a driving pinion rotatably mounted on the end of the machine frame arm which rests on the end-support, an actuating shaft journalled in bearings provided at the aforesaid end of the machine frame arm, a driving gear fixedly mounted on said actuating shaft and operatively associated with the pinion, a cam on the face of the driving gear directed towards the free end of the machine frame arm, a bell-crank lever pivotally mounted on the machine frame arm, a roller rotatably mounted on one arm of said bell-crank lever, said arm being resiliently urged to hold the roller in contact with said cam, an actuating rod connecting the second arm of the bell-crank lever to said clamping member applying and clamping device, a countershaft rotatably supported between said end-support and said shelf, a reducing and driving gear mounted on the end of the countershaft nearest the end-support and driven by the pinion, an idling gear mounted on the countershaft in the neighbourhood of the shelf, and a driven gear secured to the driven shaft and meshing with said idling gear, and means for operatively connecting said driven shaft to said core carrier.

16. In a machine for forming tubular bodies of sheet material of the type in which the joint between the longitudinal edges of the sheet material is made by means of a clamping member applied to and clamped on said edges after the tubular body has been formed, a clamping member applying and clamping device comprising a base, a body-portion projecting normally from said base, a carrier member slidably secured to one face of said body portion, a sliding jaw having an elongated operative edge and slidably mounted to one edge of the carrier member, an oscillating jaw having an operative edge parallel to and co-extensive with the operative edge of the sliding jaw and pivotally mounted to a face of the carrier member remote from the body-portion, a depending rib projecting from the aforesaid edge of the carrier member and extending between the operative edges of the jaws, a shaft passing axially through the body-portion, an operating lever fixedly mounted on the shaft in the neighbourhood of the end thereof nearest to said base, a lifting arm and a jaw retracting arm loosely mounted on the shaft, a link operatively connecting the lifting arm to the carrier member, a connection member operatively coupling the jaw-retracting arm to the sliding jaw, lost motion coupling means coupling the lifting and the jaw-retracting arms to the shaft and adapted to permit a limited relative angular movement between the parts so coupled, cam means fixedly mounted on the shaft, roller means adjustably secured to the face of the oscillating jaw adjacent the carrier member and spring-urged to contact with said cam means, resilient means extending between the carrier member and the jaw-retracting arm for yieldingly maintaining the sliding jaw in proximity to the depending rib, adjustable stop means to limit the movement of the carrier member relative to the body-portion and releasable detent means for temporarily detaining the sliding jaw in a position removed from the depending rib.

17. In a machine for forming tubular bodies of sheet material of the type in which the joint between the longitudinal edges of the sheet material is made by means of a clamping member applied to and clamped on said edges, a clamping member applying and clamping device comprising a base, a body-portion of substantially rectangular cross-section projecting normally from said base, an elongated carrier member of substantially L-shape cross-section slidably secured along the inner face of the long arm of the L to a side face of the body portion so as to be capable of movement lengthwise of said long arm, the short arm projecting over the adjacent side face of the body-portion, a sliding jaw having an elongated operative edge and slidably mounted to the free edge of the long arm so as to be capable of movement in a direction parallel to the short arm, an oscillating jaw having an operative edge parallel to and coextensive with the operative edge of the sliding jaw and pivotally mounted on the outer face of the long arm, a depending rib projecting from the aforesaid edge of the carrier member and extending between the operative edges of the jaws, a shaft passing lengthwise through the body-portion, an operating lever fixedly mounted on the shaft in the neighbourhood of the end thereof nearest to said base, a lifting arm and a jaw-retracting arm loosely mounted on the shaft, a link operatively connecting the lifting arm to the carrier member, a connection member operatively coupling the jaw-retracting arm to the sliding jaw, lost motion coupling means coupling the lifting and the jaw-retracting arms to the shaft and adapted to permit a limited relative angular movement between the parts so coupled, cam means fixedly mounted on the shaft, roller means adjustably secured to the face of the oscillating jaw adjacent the carrier member and spring-urged to contact with said cam means, resilient means extending between the carrier member and the jaw-retracting arm for yieldingly maintaining the sliding jaw in proximity to the depending rib, adjustable stop means secured to the short arm of the carrier member for limiting the movement thereof relative to the body-portion and releasable detent means for temporarily detaining the sliding jaw in a position removed from the depending rib.

18. In a machine for forming tubular bodies of sheet material of the type in which the joint between the longitudinal edges of the sheet material is made by means of a clamping member applied to and clamped on said edges after the tubular body has been formed, a clamping member applying and clamping device comprising a base, a body-portion projecting normally from said base, a carrier member slidably secured to one face of said body-portion, a rib depending from one edge of the carrier member, a sliding jaw having an elongated operative edge and slidably mounted to the aforesaid edge of the carrier member and spring-urged towards said rib, a shaft passing lengthwise through the body-portion, a jaw-retracting arm loosely mounted on the shaft, lost motion coupling means coupling said arm to said shaft, a connection member operatively connecting the arm to the sliding jaw for retracting the latter from said rib upon oscillation of the arm away from the carrier member, a detent finger having a tip normally resting on the said edge and pivotally mounted on the connection member and spring-urged towards said edge, and a rest provided on the body-portion parallel with and adjacent to the said edge of the carrier member for receiving the tip of the detent finger in the retracted position of the connection member.

19. A machine for forming tubular bodies by bending sheet material around a core comprising a forming apparatus for bending the sheet material and a core-carrier having a core, said forming apparatus including a plate having an operative surface, a cavity in said operating surface of cross-section geometrically similar to a portion of the cross-section of said core, and equal in cross-sectional area to the cross-sectional area of said portion plus the cross-sectional area of the sheet material when the core is covered by the sheet material used, a pair of slides slidably mounted on said operating surface on opposite sides of said cavity, said slides having on the side thereof nearest to the cavity a shaped face of cross-section geometrically similar to a fraction of that part of the transverse contour of said core which complements the portion corresponding to the cavity, and on the side remote from the operative surface of the plate a supporting surface for receiving the sheet material prior to its being bent, the said supporting surface being spaced from said core sufficiently to permit the insertion of the sheet material between the supporting surface and the core when the latter is in parallel alignment with the cavity and outside of the space defined by said shaped faces and the cavity taken together, actuating means for moving the slides toward and away from said cavity, operating means including a shaft located below said plate, for causing between the core on the one hand and the plate with its cavity on the other hand a relative movement of approach and separation in a direction normal to the operative surface of the plate, and means for holding the sheet material firmly against the core during the said relative movement of approach, said means comprising a longitudinal slot cut along the portion of the cavity furthest from the operative surface and passing through the plate in a direction perpendicular to the operating surface, a cam mounted on said shaft opposite to and below the slot, a supporting plate passing slidably through the slot and extending normally beyond the operative surface, one edge of said supporting plate resting on said cam and the opposite edge having the same configuration as that portion of the cavity replaced by the slot.

20. In a tubular body forming apparatus, a core, supporting means for said core, a plate having an operative surface, means for causing a relative movement of approach and separation between said core and said plate in a direction normal to said operative surface, a cavity in said operative surface of cross-section geometrically similar to a portion of the transverse contour of said core, a pair of slides slidably mounted on opposite sides of said cavity, said slides each comprising an elongated frame of substantially U-shape cross-section slidably mounted on its side on the operative surface of the plate with its mouth directed to the cavity, the arm of the U remote from the plate being longer in a direction transverse to the cavity than the arm resting on the operative surface, a shoe slidably mounted between said arms and having a portion extending beyond the end of the shorter arm thickened so as to rest on the operative surface, means depending from said thickened portion for slidably coupling the shoe to the plate, resilient means located between the shoe and the wall of the frame which joins the arms of the U for urging the shoe towards the cavity, a recess cut on the inner face of the long arm of the frame and a projection on the shoe extending into said recess and adapted to limit with respect to the frame the movement of the shoe towards the cavity, said shoe having on the side thereof nearest the cavity a shaped face of cross-section geometrically similar to a fraction of that part of the transverse contour of the core which complements the said portion thereof corresponding to the cavity.

21. In a tubular body forming apparatus, a core, supporting means for said core, a plate having an operative surface, means for causing a relative movement of approach and separation between said core and said plate in a direction normal to said operative surface, a cavity in said operative surface of cross-section geometrically similar to a portion of the transverse contour of said core, a pair of slides slidably mounted on opposite sides of said cavity, said slides each comprising an elongated frame of substantially U-shape cross-section slidably mounted on its side on the operative surface of the plate with its mouth directed to the cavity, the arm of the U remote from the plate being longer in a direction transverse to the cavity than the arm resting on the operative surface, a shoe slidably mounted between said arms and having a portion extending beyond the end of the shorter arm, means depending from the extending portion and slidably coupling the shoe to the plate, a recess in the inner face of the long arm of the frame and extending from the free end thereof in a direction away from the cavity of the plate, and having a shoulder on its end remote from said cavity, an auxiliary member slidably located in said recess, resilient means extending between said auxiliary member and a fixed point of the frame and urging same normally against said shoulder, a groove in the face of the recess corresponding to the inner face of the upper arm of the frame, a projecting stop on the auxiliary member extending freely into said groove, a slot in the face of the auxiliary member adjacent the shoe, a hollow in the face of the shoe adjacent the auxiliary member, a portion of said hollow lying in the path of the slot, a rod parallel to the axis of the cavity passing through said shoe and said hollow and rotatably mounted in said shoe, levers fixedly mounted on the ends of the rod outside the shoe, a detent fixedly mounted on the part of the rod located in the hollow and in the path of the slot, resilient means urging said detent towards said auxiliary member, the free ends of the auxiliary member and of the long arm of the frame being inclined to the operative surface of the plate, the arrangement being such that when the auxiliary member is held in its normal position against the shoulder the free end thereof forms a continuation of the free end of the long arm of the frame.

CARLOS BUTTY.